(12) United States Patent
Avello et al.

(10) Patent No.: US 10,861,087 B2
(45) Date of Patent: Dec. 8, 2020

(54) APPARATUSES, SYSTEMS AND METHODS FOR WATERCRAFT LOCKING, SHARING AND RENTAL

(71) Applicant: PADL, LLC, Key Biscayne, FL (US)

(72) Inventors: Andres Eduardo Avello, Key Biscayne, FL (US); Khalil Roger Khouri, Key Biscayne, FL (US); Felipe Ignacio Jauregui, Key Biscayne, FL (US); Muhammad Azam Malik, Coral Gables, FL (US)

(73) Assignee: PADL, LLC, Key Biscayne, FL (US)

( * ) Notice: Subject to any disclaimer, the term of this patent is extended or adjusted under 35 U.S.C. 154(b) by 0 days.

(21) Appl. No.: 16/259,842

(22) Filed: Jan. 28, 2019

(65) Prior Publication Data
US 2019/0236691 A1   Aug. 1, 2019

Related U.S. Application Data

(60) Provisional application No. 62/622,797, filed on Jan. 26, 2018.

(51) Int. Cl.
*G06Q 30/00* (2012.01)
*G06Q 30/06* (2012.01)
*G07C 9/00* (2020.01)

(52) U.S. Cl.
CPC ..... *G06Q 30/0645* (2013.01); *G07C 9/00571* (2013.01); *G07C 2009/00769* (2013.01)

(58) Field of Classification Search
CPC ............ G06Q 30/0645; G07C 9/00571; G07C 2009/00769

(Continued)

(56) References Cited

U.S. PATENT DOCUMENTS 5,917,407 A  *  6/1999  Squire ..................... B62H 3/00
                                                          194/205
6,384,717 B1 *  5/2002  Devolpi ................... B62H 3/02
                                                          194/205

(Continued)

FOREIGN PATENT DOCUMENTS

JP   2017-031786 A   2/2017
WO   2008/079027 A1  7/2008

(Continued)

OTHER PUBLICATIONS

International Search Report and Written Opinion dated May 23, 2019 in International Patent Application No. PCT/US2019/015458.

*Primary Examiner* — Ojiako K Nwugo
(74) *Attorney, Agent, or Firm* — Stroock & Stroock & Lavan LLP

(57) ABSTRACT

Devices and systems for use with a watercraft, and methods for using the same. The system includes a watercraft device for attachment to, or incorporation into, a watercraft. The watercraft device having a first watercraft lock component configured to couple with at least one second watercraft lock component, a docking station having a second watercraft lock component configured to couple with the first watercraft lock component, as well as at least one microcontroller and at least one wireless communication component within at least one of the watercraft device and docking station. The watercraft lock components, when coupled together, are configured to be placed in at least one of a locked state and an unlocked state by the at least one microcontroller, which is configured to place the watercraft lock components in an unlocked state in response to a signal received by the at least one wireless communication component.

7 Claims, 14 Drawing Sheets

(58) Field of Classification Search
USPC ........................................................ 340/5.64
See application file for complete search history.

(56) References Cited

U.S. PATENT DOCUMENTS

| | | | |
|---|---|---|---|
| 8,061,499 B2 | 11/2011 | Khairallah et al. | |
| 9,684,911 B2* | 6/2017 | Audet | G06Q 10/06 |
| 2002/0174077 A1* | 11/2002 | Yui | G06Q 30/0284 |
| | | | 705/400 |
| 2010/0201536 A1 | 8/2010 | Robertson et al. | |
| 2010/0228405 A1* | 9/2010 | Morgal | B62H 3/02 |
| | | | 701/2 |
| 2011/0018707 A1 | 1/2011 | Dobson et al. | |
| 2011/0128143 A1 | 6/2011 | Daniel | |
| 2013/0110329 A1* | 5/2013 | Kinoshita | G06F 3/041 |
| | | | 701/21 |
| 2014/0265237 A1* | 9/2014 | Strother | B62H 5/00 |
| | | | 280/297 |
| 2015/0074004 A1* | 3/2015 | Song | G07F 17/0057 |
| | | | 705/307 |
| 2015/0343993 A1* | 12/2015 | Ferrieres | B60R 25/04 |
| | | | 701/2 |
| 2018/0033311 A1* | 2/2018 | Berggren | G08G 1/205 |
| 2018/0155958 A1* | 6/2018 | Li | E05B 71/00 |
| 2019/0236691 A1* | 8/2019 | Avello | G07C 9/00309 |

FOREIGN PATENT DOCUMENTS

| | | |
|---|---|---|
| WO | 2009/140669 A2 | 11/2009 |
| WO | 2016/023080 A1 | 2/2016 |

* cited by examiner

APPARATUSES, SYSTEMS AND METHODS FOR WATERCRAFT LOCKING, SHARING AND RENTAL

CROSS REFERENCE TO RELATED APPLICATIONS

The present application claims priority to and the benefit of the filing date of U.S. Provisional No. 62/622,797, filed Jan. 26, 2018, which application is incorporated herein fully by this reference.

BACKGROUND OF THE INVENTION

Field of the Invention

The present invention relates generally to apparatuses, systems and methods suitable for locking, renting and sharing watercraft. More particularly, exemplary embodiments of the present invention relate to an automated (e.g., unattended) system for renting a watercraft having associated equipment or accessories, including, for example, a stand-up paddle board and associated paddle.

Description of Related Art

The watercraft rental industry is relatively inaccessible to many due to high equipment costs and few rental locations operating at very specific times. Rental companies as a result see low sales volumes and incur heavy costs, such as payroll to operate, and persons seeking to rent watercraft are detrimentally affected by the hours of operation, location, and fees of such rental companies. Accordingly, there is need for a watercraft rental system that is not restricted by traditional rental models.

SUMMARY OF THE INVENTION

An embodiment of the present invention is a system for use with one or more watercraft, in which the system includes a watercraft device having a first watercraft lock component, and a docking station having a second watercraft lock component configured to couple with at least the first watercraft lock component. The system also includes at least one microcontroller and at least one wireless communication component forming part of at least one of the watercraft device and docking station, where the watercraft lock components are configured to be placed in at least one of a locked state, where the watercraft device is secured to the docking station, and an unlocked state, where the watercraft device is removable from the docking station, by the at least one microcontroller. The at least one microcontroller is configured to place the watercraft lock components in the unlocked state in response to a signal received by the at least one wireless communication component.

In further embodiments of the system, the first watercraft lock component is an electronic locking mechanism, and the watercraft device further includes a processor, a microcontroller, a wireless communication component, and a data storage component containing program code. The program code is configured for controlling components of the watercraft device to instruct the microcontroller of the watercraft device to place the first watercraft lock component in the unlocked state in response to the signal received by the wireless communication component of the watercraft device. In some such embodiments the signal received by the watercraft device is a server signal. The server may generate and transmit the server signal in response to a mobile-device signal received by the communication component of the server.

In alternative further embodiments of the system, the second watercraft lock component is an electronic locking mechanism, and the docking station further includes a processor, a microcontroller, a wireless communication component, and a data storage component containing program code. The program code is configured for controlling components of the docking station to instruct the microcontroller of the docking station to place the second watercraft lock component in the unlocked state in response to the signal received by the wireless communication component of the docking station. In some such embodiments the signal received by the docking station is a server signal. The server may generate and transmit the server signal in response to a mobile-device signal received by the communication component of the server. In other such embodiments the signal received by the docking station is a watercraft-device signal.

In some embodiments the system also includes a server having at least one processor, at least one communication component, and at least one data storage component containing program code. The program code is configured for controlling server components to communicate with at least one of the watercraft device, a mobile device and the docking station. The server is configured to generate and transmit a server signal.

In other embodiments the system also includes a mobile device having a processor, at least one wireless communication component, and at least one data storage component containing program code. The program code is configured for controlling mobile-device components to communicate with at least one of the watercraft device, the docking station, and the server. The mobile device is configured to generate and transmit a mobile-device signal.

In other further embodiments the system also includes a piece of watercraft equipment or an accessory for use with the watercraft (also referred to herein as watercraft equipment), such as a paddle, helmet, or life vest. The watercraft equipment includes a watercraft-equipment device having a first watercraft-equipment lock component. The system also includes a second watercraft-equipment lock component forming part of at least one of the watercraft device and the docking station. At least one of the watercraft-equipment lock components is configured to be placed in at least one of a locked state, where the watercraft-equipment is secured to the watercraft device or the docking station, and an unlocked state, where the watercraft-equipment is removable from the watercraft device or the docking station, by a microcontroller. The microcontroller is configured to place the watercraft-equipment lock components in an unlocked state in response to the signal received by a wireless communication component. In some further embodiments the second watercraft-equipment lock component, the microcontroller, and the wireless communication component form part of the watercraft device. In other further embodiments the second watercraft-equipment lock component, the microcontroller, and the wireless communication component form part of the docking station.

Additional embodiments include a software application for locating, unlocking, renting and/or tracking the watercraft device attached to a watercraft. In certain embodiments, the software application is configured to send information to, and receive information from, (e.g., wirelessly, via a network) the server, the watercraft device, the docking station, and/or a mobile device. Additional embodiments include a server, remote from the docking station, executing software for sending and receiving information from the watercraft device attached to a watercraft, such as instructions to unlock a lock component on the watercraft device or docking station. The server may be configured to send information to, and receive information from, the watercraft device, the docking station, and/or a software application.

In further embodiments, the system may also include, or be for use with, one or more mobile devices (such as a smart phone) having a processor executing the software application, at least one wireless communication component, at least one data storage component, and a power source, with the software application stored on the mobile device. In certain embodiments, the software application is configured to generate information to be sent via the mobile device to the watercraft device, the server, and/or the docking station.

Another embodiment of the present invention includes a watercraft device for selectively locking and unlocking a watercraft. The device includes a watercraft device lock component, and a unique identifier. The device also includes a water resistant case, where the water resistant case contains a processor, a power component electrically connected to the processor, a data storage component operatively coupled to the processor, a location tracking component operatively coupled to the processor, and a wireless communication component operatively coupled to the processor. The wireless communication component is configured to communicate with at least one of a docking station, a server, and a mobile device.

Other embodiments of the present invention include a method for automated renting of watercraft. The method includes providing a watercraft system having a watercraft device that is configured to attach to, or form part of, a watercraft. The watercraft device includes a first watercraft lock component. The system also has at least one docking station that includes at least one second watercraft lock component configured to couple with at least the first watercraft lock component. At least one of the watercraft lock components is configured to be placed in at least one of a locked state, where the watercraft device is secured to the docking station, and an unlocked state, where the watercraft device is removable from the docking station, by at least one microcontroller. The at least one microcontroller is configured to place the watercraft lock components in the unlocked state in response to a signal received by at least one wireless communication component. The at least one microcontroller and at least one wireless communication component form part of the watercraft device and/or the docking station. The method further includes providing program code to a mobile device of a user. The mobile device has a processor, at least one wireless communication component, at least one data storage component, and at least one power component. The method also includes receiving, at a server, a mobile-device signal, the mobile-device signal including application-request information generated by the program code and corresponding to a request to place at least one of the watercraft lock components in an unlocked state. The method also includes sending from the server to at least one of the watercraft device, the mobile device and the docking station, a server signal in response to the application-request information. The responsive server signal including watercraft-component information concerning at least one watercraft lock component. The method also includes instructing a microcontroller to place at least one of the watercraft lock components in the unlocked state in response to receiving a signal containing watercraft-component information.

BRIEF DESCRIPTION OF THE DRAWINGS

The various aspects, features and embodiments disclosed herein will be better understood when read in conjunction with the drawings provided. Embodiments are provided in the drawings for the purposes of illustrating aspects, features and/or various embodiments of the watercraft locking, sharing and renting system. It should be understood, however, that the invention is not limited to the precise arrangement, structures, subassemblies, features, embodiments, aspects and devices shown, and the arrangements, structures, subassemblies, features, embodiments, aspects and devices shown may be used singularly or in combination with other arrangements, structures, subassemblies, features, embodiments, aspects and devices. The drawings are not necessarily to scale and are not in any way intended to limit the scope of this invention, but are merely presented to illustrate and describe various embodiments, aspects and features of a watercraft locking, sharing and renting system, its method of operation, and construction, which may be used singularly or in combination, or with additional features, aspects or embodiments.

DETAILED DESCRIPTION OF EMBODIMENTS OF THE INVENTION

Figure 1:
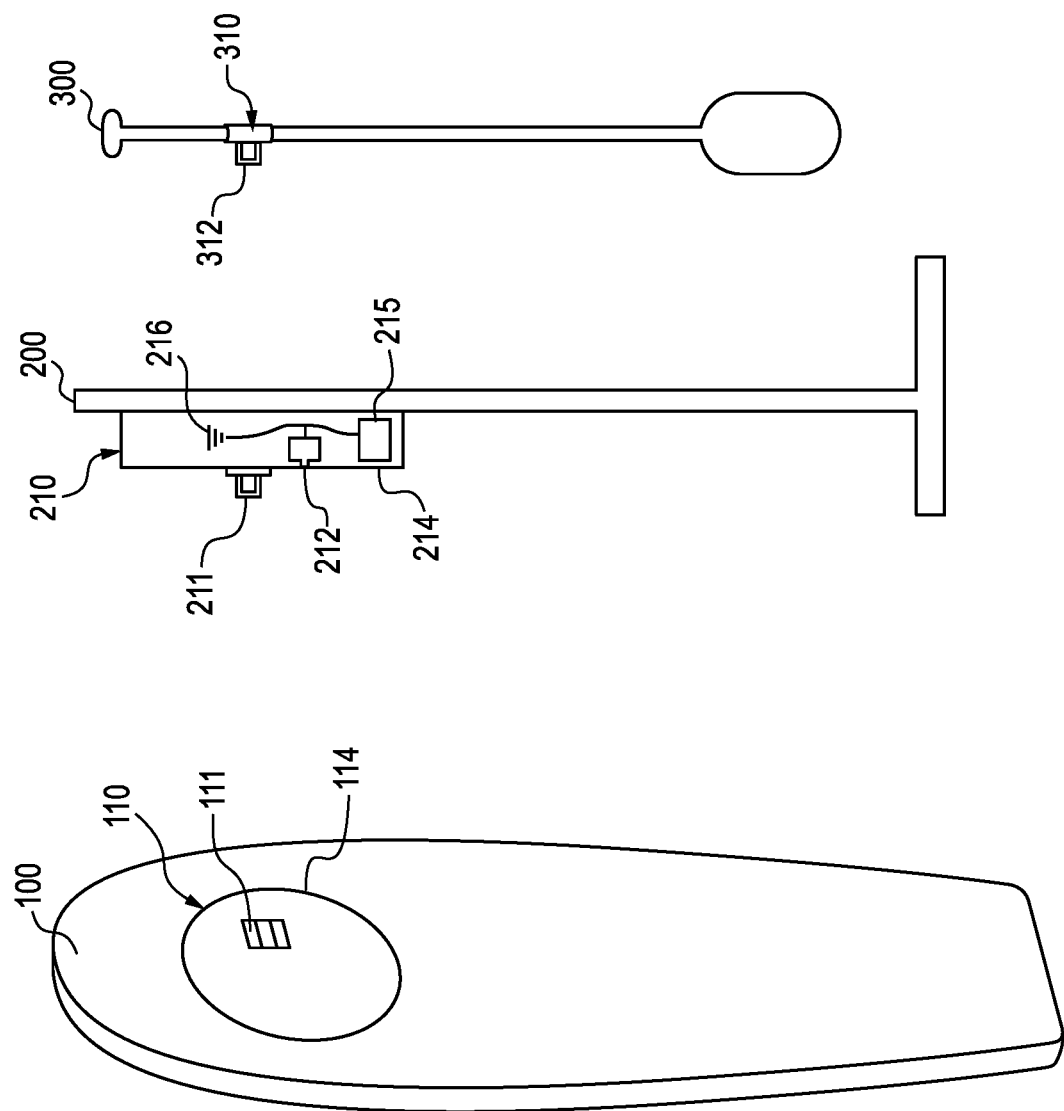
FIG. 1 is an illustration of an embodiment of a watercraft locking, sharing and renting system.

In the following detailed description, numerous details are set forth in order to provide an understanding of embodiments of a watercraft locking, sharing and renting system, its method of operation, and construction. However, it will be understood by those skilled in the art that the and the scope of the present invention should not be limited to the embodiments, subassemblies, or the specific features or details shown. The description provided herein is directed to one of skill in the art and in circumstances, well-known methods, procedures, components and assemblies have not been described in detail so as not to obscure the watercraft locking, sharing and renting system.

Accordingly, it will be readily understood that the components, aspects, features, elements and subassemblies of the embodiments, as generally described and illustrated in the figures herein, may be arranged and designed in a variety of different configurations in addition to the described embodiments. The following descriptions are intended only by way of example, and simply illustrate certain selected embodiments of a watercraft locking, sharing and renting system. The claims appended hereto will set forth the claimed invention and should be broadly construed to cover watercraft locking, sharing and renting systems, as well as methods of operation, unless otherwise clearly indicated to be more narrowly construed to exclude certain specific embodiments.

It should be understood that the disclosure uses the term "watercraft" to refer to a vessel or water-borne vehicle, including, but not limited to, a paddle board, a surf board, a kayak, a canoe, and a paddle boat. It should be understood that the disclosure uses the term "docking station" to refer to a structure, such as a stand-alone unit (e.g., rack), or a unit for attachment to a preexisting structure, either of which may be located inside or outside. It should be understood that the disclosure uses the term "watercraft equipment" to refer to an accessory or equipment for use with the watercraft, such as, for example, a paddle, oar, life vest, flotation device, or helmet. For ease of description the disclosure does not always refer to or list the number of individual components or elements, such that a singular reference to a component or element may be a reference to one or more such elements unless the context indicates otherwise.

Embodiments of the present invention generally concerns a watercraft, and watercraft equipment, locking and automated renting system that includes a docking station, such as a rack, that may be kept at a storefront or generally outside, a device that is mounted (e.g., fixed) to, or part of, the watercraft and configured to releasably couple to (e.g., lock to) the docking station, a device that is mounted to the watercraft equipment and configured to releasably couple to (e.g., lock to) the docking station or to the device mounted to the watercraft.

The docking station may have a lock that is activated wirelessly (for example, via BlueTooth or Wi-Fi) to lock or unlock the lock. The docking station may have a wireless or direct connection to the device of the watercraft to charge any electronics on the device of the watercraft. The docking station may also have a Radio Frequency ("RF") chip or signal scanner or detector to identify the device mounted to, or part of, the watercraft or the device mounted to the piece of watercraft equipment.

The device of the watercraft may contain a microcontroller board (e.g., an Arduino microcontroller) that sends or receives information to or from a user's mobile application or to or from a webserver through cellular, Wi-Fi, or BlueTooth ("BT") connection. The microcontroller board may be configured to communicate with components of the docking station or components of the device of the watercraft. The microcontroller board may be configured to communicate with Global Positioning Systems ("GPS"), cellular chips (GSM), RF devices, and/or other components of the watercraft, the docking station, or the watercraft equipment. The device mounted to the watercraft may have a solar panel and or connection to the rack to charge a battery that powers electronics. Any item in the system of the invention may have BT, Quick Response ("QR") codes, or other unique identifiers, such as a RFID chip, that may be scanned or received and inputted through a user's mobile device or application to identify that the user is near the system and wishes to interact with it. For example, a user's mobile device may scan a QR code on a watercraft or docking station, or receive a BT signal of, a watercraft device, watercraft equipment, watercraft-equipment device, docking station or docking-station device, which a watercraft renting, sharing and locking program code, such as a software application, stored on the mobile device is configured to process and identify as associated with the system and available or not available for use.

More specifically, embodiments of the present invention concern "self-managed" (i.e., user-managed) watercraft locking, sharing and renting systems, enabling watercraft to be available for sharing and renting in more locations, twenty-four hours a day (or to the extent desired), without the need for incremental payroll from store owners in order to manage additional rental units. Preferably, a docking station in the form of a rack has multiple rental units attached and is located at or near a storefront, preferably outside, such that the rental units are available to consumers twenty-four hours a day. A rental unit includes at least one watercraft. Optionally, a rental unit may also include at least one piece of watercraft equipment. A rental unit is configured to lock to at least one docking station. For example, a watercraft may include a watercraft lock component that locks to a docking-station lock component. Optionally, watercraft equipment may include an equipment lock component that locks to either an additional watercraft lock component or an additional docking-station lock component (e.g., such that the watercraft and the associated equipment are configured to be locked/unlocked from the docking station together, as a unit, or individually and the presence of the watercraft and the associated equipment are tracked together).

The watercraft locking, sharing and renting system may also include a server. The server may include one or more processors, one or more communication components, such as wire based communication components (for example, ethernet) or wireless communication components (for example, 802.11 or mobile communication), one or more data storage components, one or more power component, and program code, such as software or firmware, running therein that may be a watercraft renting, sharing and locking software platform or a portion thereof. The server may be configured to communicate with one or more mobile device, one or more docking stations, one or more docking-station devices, one or more watercraft devices, and/or one or more computers. The server may be configured to send and receive information, such as data, from a watercraft device, docking station, docking-station device, and/or internet connected device, and store the received information, or a portion thereof, in one or more data storage components. For example, the server may be configured to receive and store watercraft-device location information, watercraft availability information, or other information received from a device of the system, and send such information to another internet connected device. The server may be accessible by consumers and rack/rental unit owners via an internet connection, for example, the computer readable/executable program code and/or stored data of the server may be accessible via an internet browser application or program code (such as, software or firmware) of another internet connected device, such as a mobile device, computer, watercraft device, docking station, and/or docking-station device.

The watercraft locking, sharing and renting system may include a software platform, such as software and/or firmware including computer readable program code, having a user-facing portion and an owner portion, for example, a rental portion, intended for consumers, and a management portion, intended for owners. Alternatively, the software platform of the watercraft locking, sharing and renting system may include distinct software applications specific to consumers and specific to owners. For example, a rental platform intended for consumers and a management platform intended for owners. The software may be accessed by consumers and rack/rental unit owners via an internet connection. For example, the software may be accessible via an internet browser application or may be at least one stand-alone application available for downloading to a mobile device, such as a smartphone, or other internet connected device, such as a computer. The software platform may include various portions that in total comprise the software platform, such as, for example, computer readable/executable program code intended for watercraft or watercraft devices, computer readable/executable program code intended for users' devices, server software intended for system servers, computer readable/executable program code intended for docking stations or docking-station devices, and/or computer readable/executable program code intended for owners' internet connected devices. As a result, the rental units are self-managed units available to consumers for renting via one or more portions of the software platform, such as computer readable/executable program code including a rental application, which a consumer utilizes to unlock a selected rental unit. The rack and rental units are able to be monitored and managed by rack and/or rental unit owners via the software, such as a management web application.

Figure 2:
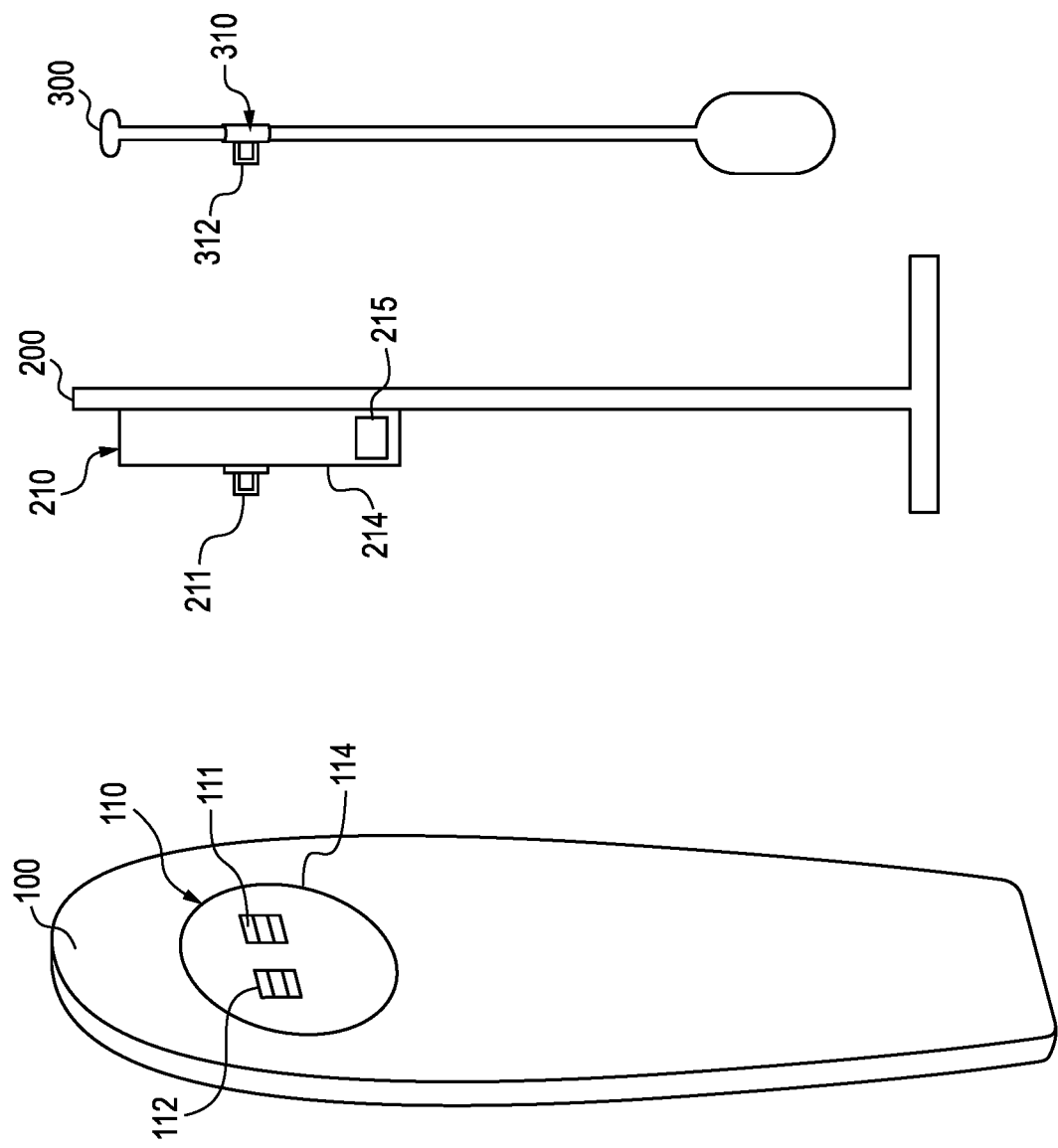
FIG. 2 is an illustration of a further embodiment of a watercraft locking, sharing and renting system.
Figure 3:
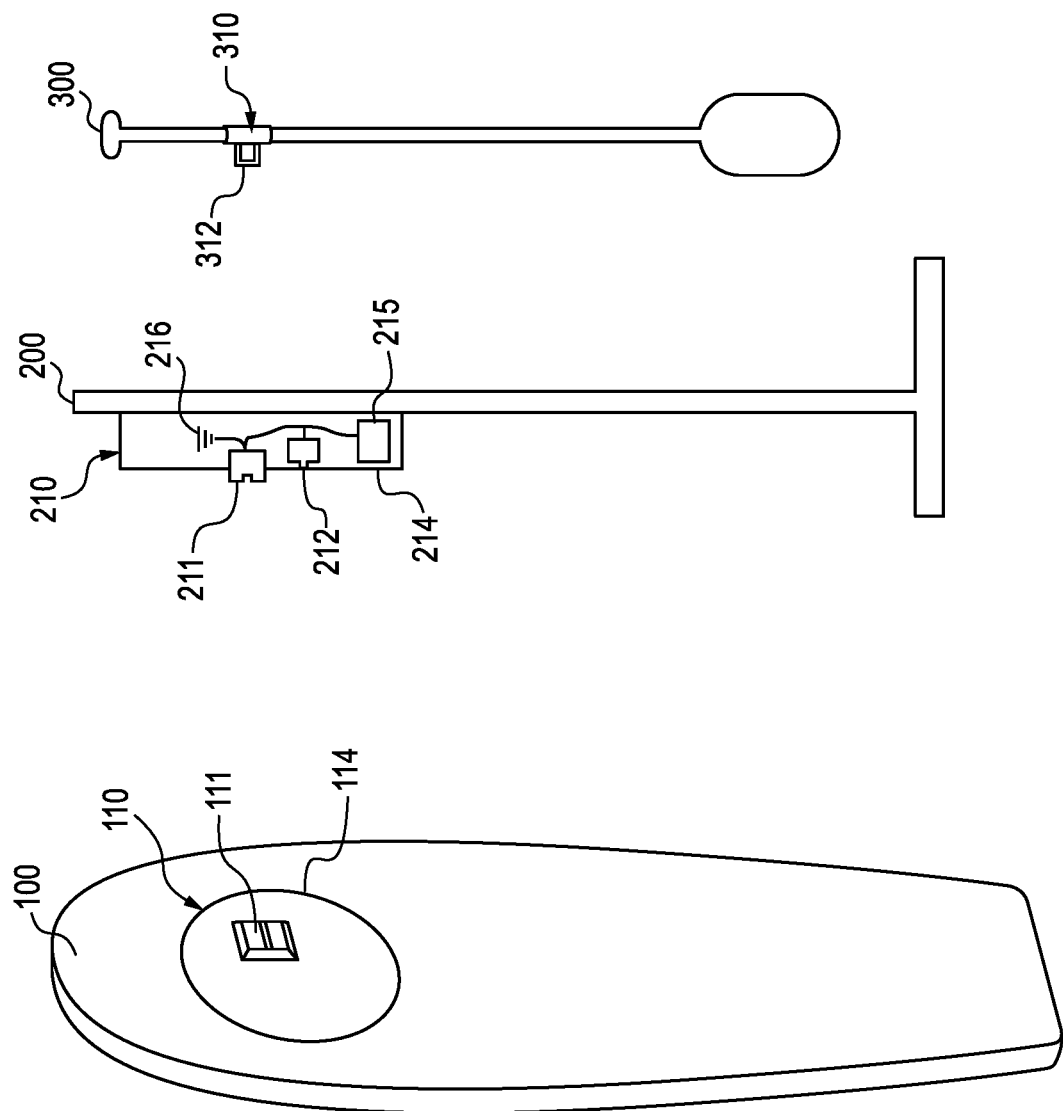
FIG. 3 is an illustration of another embodiment of a watercraft locking, sharing and renting system.

Embodiments of the invention will now be described with reference to FIGS. 1, 2 and 3. As illustrated therein, one embodiment of the watercraft locking, sharing and/or renting system includes a watercraft 100 having a watercraft-borne device ("WD") 110, and a docking station 200 having a docking-station device ("DD") 210. The embodiment further includes optional watercraft equipment 300 having a watercraft-equipment device ("ED") 310. The watercraft 100 generally includes at least one watercraft lock component 111, 112 and a case 114. The docking station 200 generally includes at least one docking-station lock component 211, 212. The watercraft equipment 300 generally includes a watercraft-equipment lock component 312. The docking-station lock component 211, 212 may be part of, or separate from, the docking-station device 210. The watercraft lock component 111, 112 may be part of, or separate from, the watercraft device 110. The watercraft-equipment lock component 312 may be part of, or separate from, the watercraft-equipment device 310. As illustrated in FIGS. 1, 2 and 3, it is to be understood that the watercraft 100 is configured to lock to the docking station 200, and the watercraft equipment 300 may be configured to lock to either the docking station 200 or the watercraft 100.

The WD 110 is securely attached to the watercraft 100. The WD 110 may be securely attached to the top surface of the watercraft 100, for example, by screws, rivets, or other attachment mechanisms. Alternatively, the WD 110 may be secured within the body of the watercraft. In certain embodiment a portion of the WD 110 protrudes from the top surface of the watercraft 100, for example, by forming the body of the watercraft 100 around a portion of the WD 110, or by placing the WD 110 within a recess in the watercraft 100 and utilizing an adhesive, a seal, a screw, a rivet, or other securing means to attach the WD 110 within the recess. Preferably, the WD 110 has a low profile when attached to the watercraft 100, and, more preferably, is flush or recessed within the surface of the watercraft 100. In some embodiments, the WD is built into the watercraft such that the WD does not require attachment to the watercraft. For example, the watercraft may be fabricated containing the WD, with the watercraft lock component of the WD exposed for coupling with at least one docking-station lock component.

In some embodiments, a watercraft lock component 111, 112 may be an electronic locking mechanism, for example, an electronic lock latch having an electronically activated bolt, configured to be controlled by components within the case 114. Preferably, the watercraft lock component 111, 112 is water resistant, and, more preferably, is waterproof. A watercraft lock component 111, 112 may include a mechanism capable of moving a locking portion of the watercraft lock component 111, 112 into various positions, for example an electromagnet, a solenoid, or electric motor. The watercraft lock component 111, 112 may be operatively coupled to a microcontroller within the WD 110. The watercraft lock component 111, 112 may be operatively controlled to be placed in a locked state or an unlocked state by the microcontroller within the WD case 114. In other embodiments the watercraft lock component 111, 112 may be stationary, for example an aperture configured to receive a docking-station lock component 211, 212 or watercraft-equipment lock component 312, or an eye hook configured to be received by a docking station lock component 211, 212 or watercraft-equipment lock component 312.

In other embodiments, the one or more docking-station lock component is configured to receive and releasably secure (e.g. lock and unlock) the watercraft lock component and/or the watercraft-equipment lock component. For example, the docking-station lock components may include at least one locking mechanism corresponding to the at least one watercraft lock component and may include at least one locking mechanism corresponding to the at least one watercraft-equipment lock component. One or more docking-station locking mechanism may be an electronic lock, for example, an electronic lock latch having an electronically activated bolt, configured to be controlled by components within the docking station or docking-station device. The locking mechanism may be an electromagnet, a solenoid, or electric motor. The locking mechanism may be operatively coupled, for example by cables, to control components of the docking station or docking-station device, for example to a microcontroller within the docking station or docking station device. As such, in some embodiments, the docking-station lock component may be operatively controlled to be placed in a locked state or an unlocked state by a microcontroller within the docking station or docking-station device.

As illustrated in the embodiment of FIG. 1, the watercraft 100 has a watercraft device ("WD") 110 mounted to the watercraft. The WD includes a watercraft-device lock component ("WDL") 111, which may be an electronic locking mechanism, for example, an electronic lock latch having an electronically activated bolt, configured to be controlled by components within the case 114. The WDL 111 may include a mechanism capable of moving a locking portion of the WDL 111 into various positions, for example an electromagnet, a solenoid, or electric motor. The WDL 111 may be operatively coupled to a microcontroller within the WD 110. The watercraft lock component 111 may be operatively controlled to be placed in a locked state or an unlocked state by the microcontroller within the WD case 114. The docking station 200 includes a docking-station device ("DD") 210 that may be attached to, or form a part of, an independent structure, for example a rack, or may be attached to a preexisting structure. The DD 210 generally includes a docking-station-watercraft lock component ("DDWL") 211 and a case 214. The case 214 is preferably water resistance, and more preferably is water proof. In some embodiments, the DDWL 211 is configured to be received by and releasably (and selectively, as controlled by the watercraft device 110) secure (e.g., locked) the WDL 111. In some embodiments, the DDWL 211 may have a recess or aperture corresponding to a portion of the locking mechanism of the WDL 111. For example, in one embodiment the DDWL 211 is an eye hook, providing an opening that a moveable bolt within the WDL 111 may pass through. The DD 210 may also include a docking-station-watercraft-equipment lock component 212, configured to releasably (and selectively, as controlled by the DD 210) secure (e.g., lock) the ED 312.

The docking-station device case 214 may encapsulate components 215 including a microcontroller, wireless communication components, a processor, and data storage components. The docking-station device case 214 may encapsulate power supply components 216 that may include a battery, which may be rechargeable and may be replaceable. The power supply components may include an electrical connection capable of being connected to a solar panel or other electricity source. The power supply components may be electrically connected to the docking station lock components or other electrical contacts. The wireless communication components may include cellular communication means configured to transmit and receive data via a wireless service provider, and may include radio communication means configured to transmit and receive data via electromagnetic wave signals. The cellular communication means may include a cellular modem and may be operatively coupled to a processor or a microcontroller. The cellular modem may include an antenna and may include a cellular modem or personal communication service modem. The radio communication means may include a radio-frequency transducer and may include a Bluetooth modem, and may be operatively coupled to a processor or a microcontroller. The radio-frequency transducer may be a bidirectional transducer, and may be configured for short range communication. The DD may be configured to receive information from a WD, a ED, a server, and/or a mobile device, and may be configured to send information to a WD, a ED, a server, and/or a mobile device.

The wireless communication components may be configured to scan and/or receive signals to detect a watercraft device, for example if placed in a locked state in relation to the docking station device, and acquire a unique identifier of the watercraft device. The docking-station device components may be configured to scan and/or receive signals to confirm/identify an electrical lock component in a locked state, and acquire a unique identifier of the electrical lock component. Optionally, the wireless communication components may be configured to scan and/or receive signals to detect a watercraft equipment device, for example if placed in a locked state in relation to the docking station device or in relation to a watercraft device that is itself in locked state in relation to the docking station device, and acquire a unique identifier of the watercraft equipment (e.g., paddle). The data storage component may include random access memory (RAM) and may be operatively coupled to a processor or microcontroller.

The WDL 111 is configured to receive the DDWL 211. The WDL 111 may be operatively coupled to a microcontroller within the WD case 114, and may be operatively controlled to be placed in a locked state or an unlocked state by the WD microcontroller to secure/release the WD 110 in relation to the DD 210.

The watercraft locking, sharing and renting system may also include watercraft equipment 300 (e.g, a paddle, oar, life vest, flotation device, helmet). The watercraft equipment 300 may include a watercraft-equipment-borne device ("ED") 310 attached to, or part of, the equipment 300. The ED 310 may be securely attached to the equipment 300 by, for example a screw, a rivet, an adhesive, or other attachment means. In some embodiments, the ED 310 may be configured to be secured around the equipment, for example a ring placed and attached around the handle of a paddle. In some embodiments the ED may be secured to the equipment via compression. For example, an ED may include multiple portions which fit flush around the bar of a paddle and the multiple portions are attached to each other, for example by screws or other attachment means, such that the multiple portions compress against the bar to securely attach the ED to the equipment. The ED 310 may include a watercraft-equipment device lock component ("EDL") 312. The ED may include a unique identifier, which may be electronically scanable, such as an RFID chip, or be visibly scanable, such as a QR code. In some embodiments, the ED includes electrical components, such as, for example, a power component, a microcontroller, a wireless communication component, and/or electronic lock component. In some embodiments, the ED is built in to the equipment such that the ED does not require attachment to the equipment. For example, a watercraft equipment may be fabricated containing the ED, with the watercraft-equipment lock component exposed for coupling with a lock component of a watercraft, watercraft-device, docking station, and/or docking-station device.

The docking station device 210 may include a docking-station-watercraft-equipment lock component ("DDEL") 212. The DDEL 212 and the DDWL 211 may be offset on the DD so that the watercraft and the watercraft equipment may be simultaneously locked to the docking station. The DDEL 212 may be an electronic lock latch and may be controlled by components within the DD case 214. Preferably, the DDEL 212 is water resistant, and, more preferably, is waterproof. The DDEL 212 may include a mechanism capable of moving a locking portion of the DDEL 212 into various positions, for example an electromagnet, a solenoid, or electric motor. The DDEL 212 is configured to receive the EDL 312. The EDL 312 is configured to be secured to the DDEL 212, for example by having a recess or aperture corresponding to a portion of the locking mechanism of the DDEL 212. For example, the EDL 312 may be an eye hook, providing an opening that a bolt within the DDEL 212 may pass through. The DDEL 212 may be operatively coupled to the DD microcontroller, and may be operatively controlled to be placed in a locked state or an unlocked state by the DD to attach/release the ED in relation to the DD.

Referring to FIG. 2, an alternative embodiment of the watercraft locking, sharing and renting system of FIG. 1 is illustrated including a watercraft 100 having a watercraft-borne device ("WD") 110, a docking station 200 having a docking-station device ("DD") 210, and a watercraft equipment 300 having an equipment device ("ED") 310.

The WD 110 includes a first lock component ("WL1") 111 and a second lock component ("WL2") 112. The WDL1 may be a watercraft-device lock component, and the WDL2 may be a watercraft-device-watercraft-equipment lock component. The DD 210 includes a docking-station-watercraft lock component ("DDWL") 211, which may be an eyehook. The ED 210 includes a watercraft-equipment device lock component ("EDL") 312, which may be an eyehook. The WL1 is configured to receive the DDWL 211. The WL1 111 may be an electronic lock latch operatively coupled to a microcontroller within the WD case 114, and may be operatively controlled to be placed in a locked state or an unlocked state by the WD microcontroller to attach/release the WD in relation to the DD. The WL2 112 is configured to receive the EDL 312. The WL2 112 may be an electronic lock latch operatively coupled to a microcontroller within the WD case 114, and may be operatively controlled to be placed in a locked state or an unlocked state by the WD microcontroller to attach/release the ED in relation to the WD.

Referring to FIG. 3, another alternative embodiment of the watercraft locking, sharing and renting system of FIG. 1 is illustrated including a watercraft 100 having a watercraft-borne device ("WD") 110, a docking station 200 having a docking-station device ("DD") 210, and a watercraft equipment 300 having an equipment device ("ED") 310.

The WD 110 includes a watercraft-device lock component ("WDL") 111, which may be an eyehook. The DD 210 includes a includes a docking-station-watercraft lock component ("DDWL") 211 and a docking-station-watercraft-equipment lock component ("DDEL") 212. The ED 210 includes an equipment device lock component ("EDL") 312, which may be an eyehook. The DDWL 211 is configured to receive the WDL 211 and the DDEL 212 is configured to receive the EDL 312. The DDWL 211 may be an electronic lock latch operatively coupled to a microcontroller within the DD case 214, and may be operatively controlled to be placed in a locked state or an unlocked state by the DD microcontroller to attach/release the WD in relation to the DD. The DDEL 212 is configured to receive the EDL 312. The DDEL 212 may be an electronic lock latch operatively coupled to a microcontroller within the DD case 214, and may be operatively controlled to be placed in a locked state or an unlocked state by the DD microcontroller to attach/release the ED in relation to the DD.

Alternatively, the lock components that connect to secure the watercraft to a docking station may be referred to as first and second watercraft lock components. Alternatively, the lock components that connect to secure the watercraft equipment to a docking station or to a watercraft device may be referred to as first and second watercraft-equipment lock components.

Figure 4A:
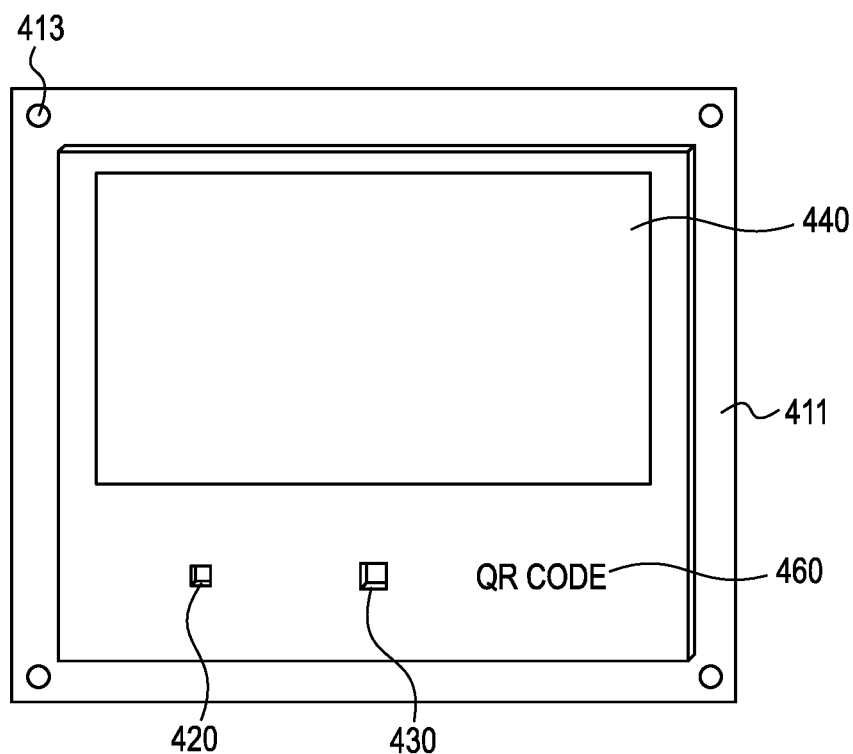
FIG. 4A is an illustration of an embodiment of an outer portion of a case of a watercraft-borne device of a watercraft locking, sharing and renting system.
Figure 4B:
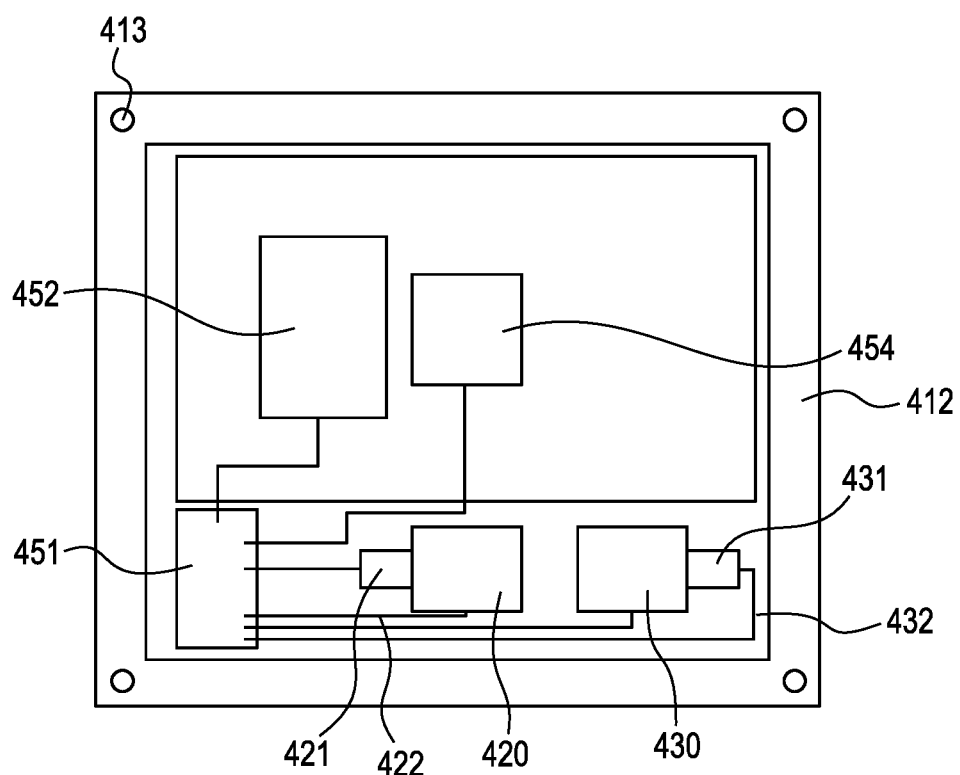
FIG. 4B is an illustration of an embodiment of an inner portion of a watercraft-borne device of a watercraft locking, sharing and renting system.
Figure 4C:
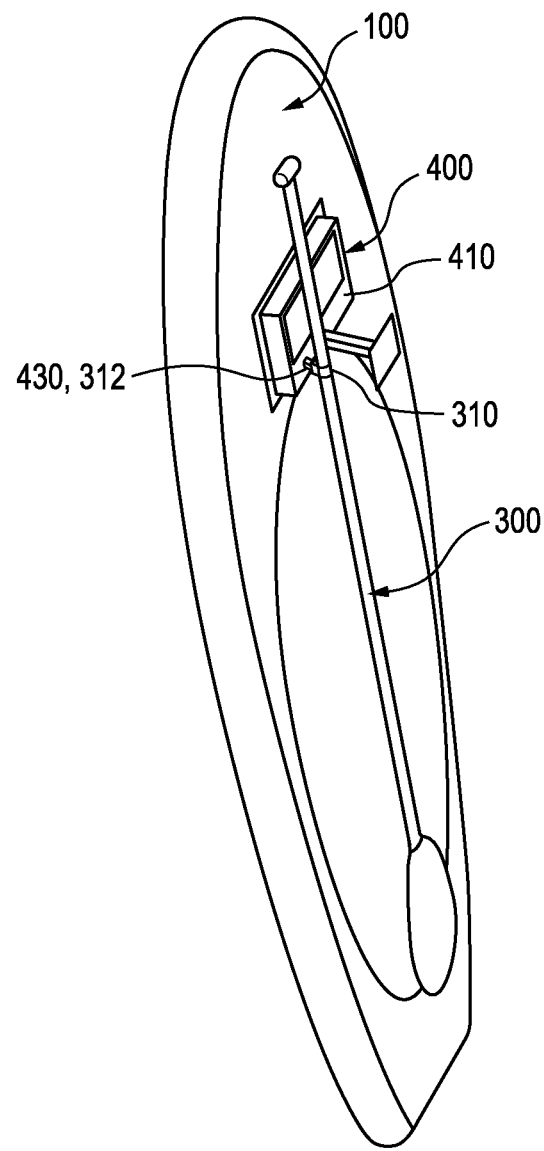
FIG. 4C is an illustration of an embodiment of a watercraft locking, sharing and renting system in a locked state without a docking station shown.

An embodiment of the WD case will now be described with reference to FIGS. 4A 4B, and 4C. A watercraft device 400 may include a case 410, having a cover 411 and a base 412, at least one watercraft-device lock component, 420, 430, a unique identifier 460, for example a QR code, a solar panel cover 440. The watercraft device 400 may include, encapsulated within the case 410, components including electrical components, and may include mechanical components. The case 410, when the cover 411 is secured and/or sealed to the base 412, is preferably water resistant, and more preferably is water proof. The case 410 may include at least one aperture 413, which may extend through the cover 411 and base 412. The case 410 may be of various shapes, for example rectangular, square, circular, or elliptical, and is configured to be attached to a watercraft.

The watercraft device components may include control components 451, such as a microcontroller circuit board, wireless communication components, wireless location tracking components, a processor, and/or data storage components. The wireless communication component may include cellular communication means configured to transmit and receive data via a wireless service provider, and may include radio communication means configured to transmit and receive data via electromagnetic wave signals. The cellular communication means may include a cellular modem and may be operatively coupled to a processor or a microcontroller. The cellular modem may include an antenna and may include a cellular modem or personal communication service modem. The radio communication means may include a RF transducer and may include a BT modem, and may be operatively coupled to a processor or a microcontroller. The RF transducer may be a bidirectional transducer, and may be configured for short range communication. The wireless location tracking components may include a wireless modem and may include a radiolocation receiver configured to receive electromagnetic frequency waves or signals from fixed radiolocation towers or global positioning system satellites. The radiolocation receiver may be operatively coupled to a processor or microcontroller, and the wireless modem may be operatively coupled to a processor or microcontroller. The data storage component may include random access memory ("RAM") and may be operatively coupled to a processor or microcontroller. The watercraft device components may include power components 452. The power components may be a battery, which may be rechargeable and may be replaceable. The watercraft device components may include a solar panel 454, electrically connected to the power components 452.

In some embodiments, the watercraft device components may include at least one locking mechanism 421, 431 corresponding to the at least one watercraft lock component 420, 430. Preferably, the watercraft lock component 420, 430 is water resistance, and, more preferably, is waterproof. In some embodiments, the at least one watercraft lock component 420, 430 may be an electronic lock, for example, an electronic lock latch having an electronically activated bolt, configured to be controlled by components within the case 410. The locking mechanism 421, 431 may be an electromagnet, a solenoid, or electric motor. The locking mechanism 421, 431 may be operatively coupled, for example by cables 422, 432, to the control components 451, for example to a microcontroller within the WD 400. As such, in some embodiments, the watercraft lock component 420, 430 may be operatively controlled to be placed in a locked state or an unlocked state by the microcontroller within the WD case 410. The WD 400 may have an assigned unique identifier. The unique identifier may be electronically stored by a control component 451 within the WD case 410, or may be a visible mark or set of markings 460 on the external surface of the WD case cover 411, for example a QR code to be read by a component of a consumer's mobile device, such as a camera.

Figure 5:
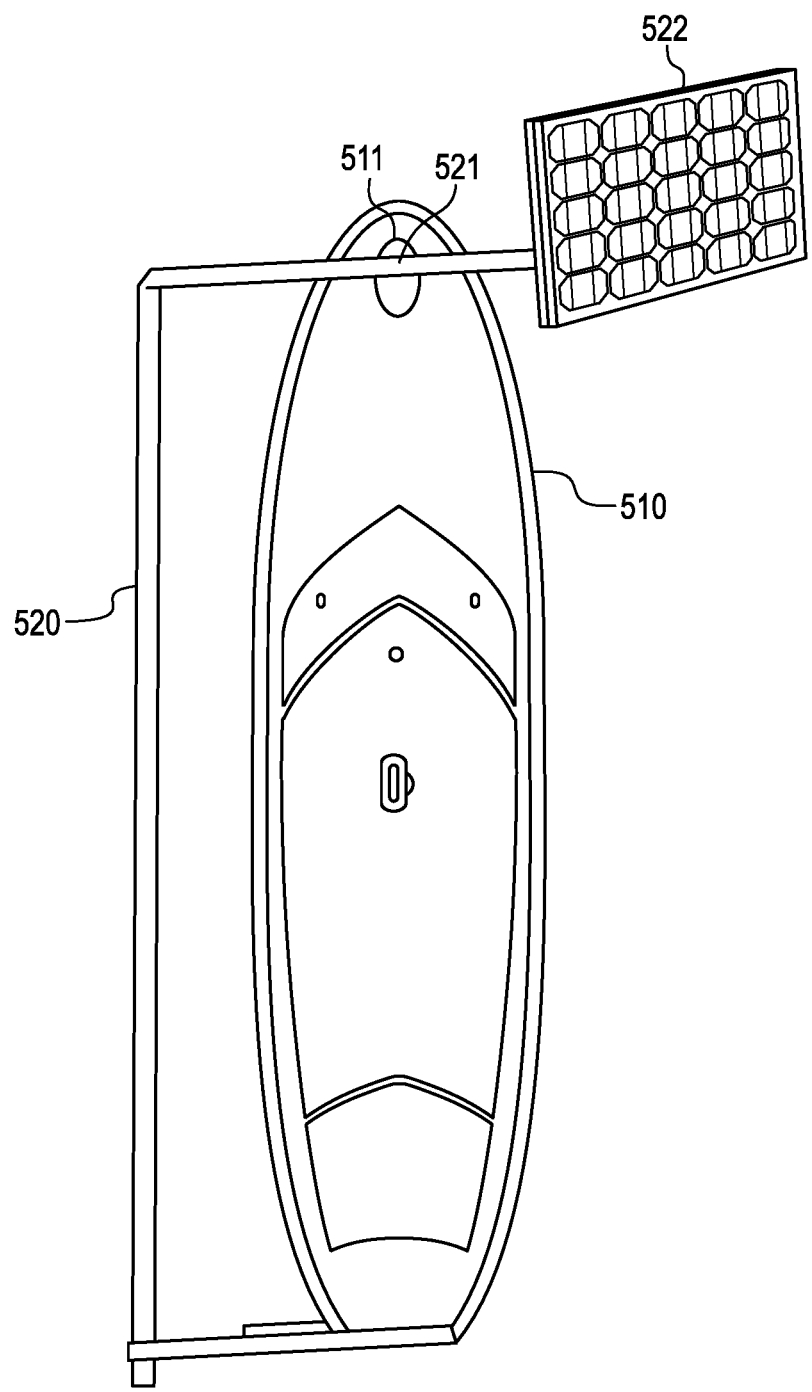
FIG. 5 is an illustration of another embodiment of a watercraft locking, sharing and renting system in a locked state.

Referring to FIG. 5, an embodiment of a watercraft locking, sharing and renting system of the present invention is illustrated as having a watercraft 510, in a locked state, secured to a docking station 520. The docking station 520 may be an independent structure and include a solar panel 522. Preferably, the docking station 520 is located outside, more preferably, at a store front. The docking station may encapsulate a docking station device 521 (not visible), such that any electrical components of the docking station device are protected from weather. The watercraft 510 includes a watercraft device 511, which is utilized to secure the watercraft 510 to the docking station 510. As discussed in relation to FIGS. 1, 2, 3 and 4, the watercraft device preferably includes a watercraft-device lock component which is compatible with a lock component of the docking station, such as a docking-station-watercraft lock component. The solar panel 522 may be configured to supply power to components within the docking station, and may be configured to supply power to the power component of the watercraft device 521, such that the watercraft device 511 may be recharged when in a locked state in relation to the docking station 520.

Figure 6A:
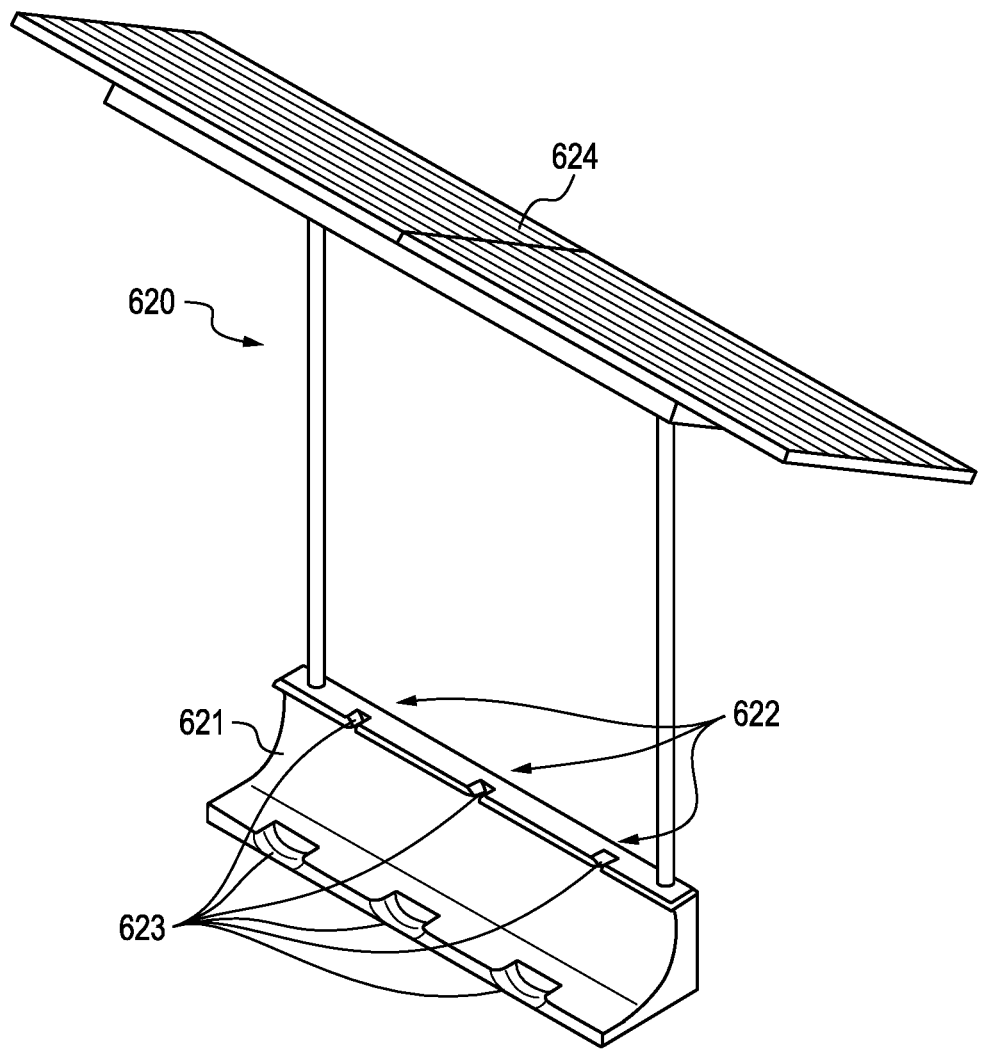
FIG. 6A is an illustration of an embodiment of a docking station of an embodiment of a watercraft locking, sharing and renting system.
Figure 6B:
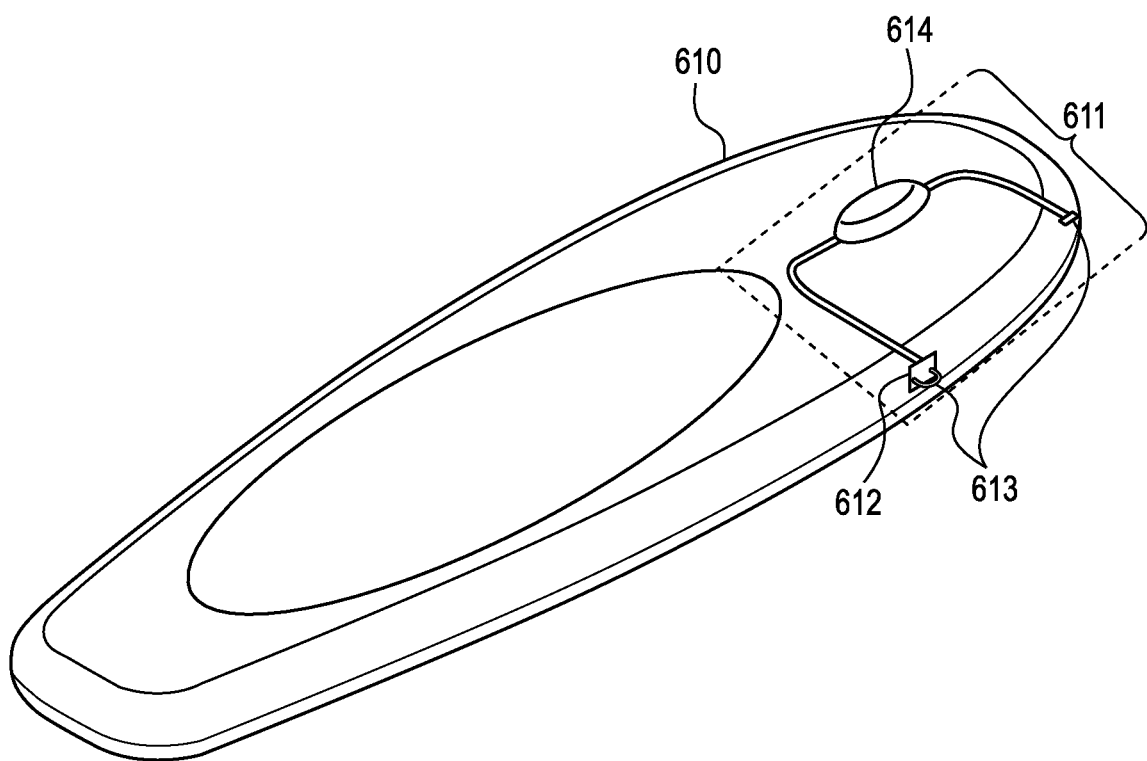
FIG. 6B is an illustration of an embodiment of a watercraft and watercraft-borne device of an embodiment of a watercraft locking, sharing and renting system.
Figure 6C:
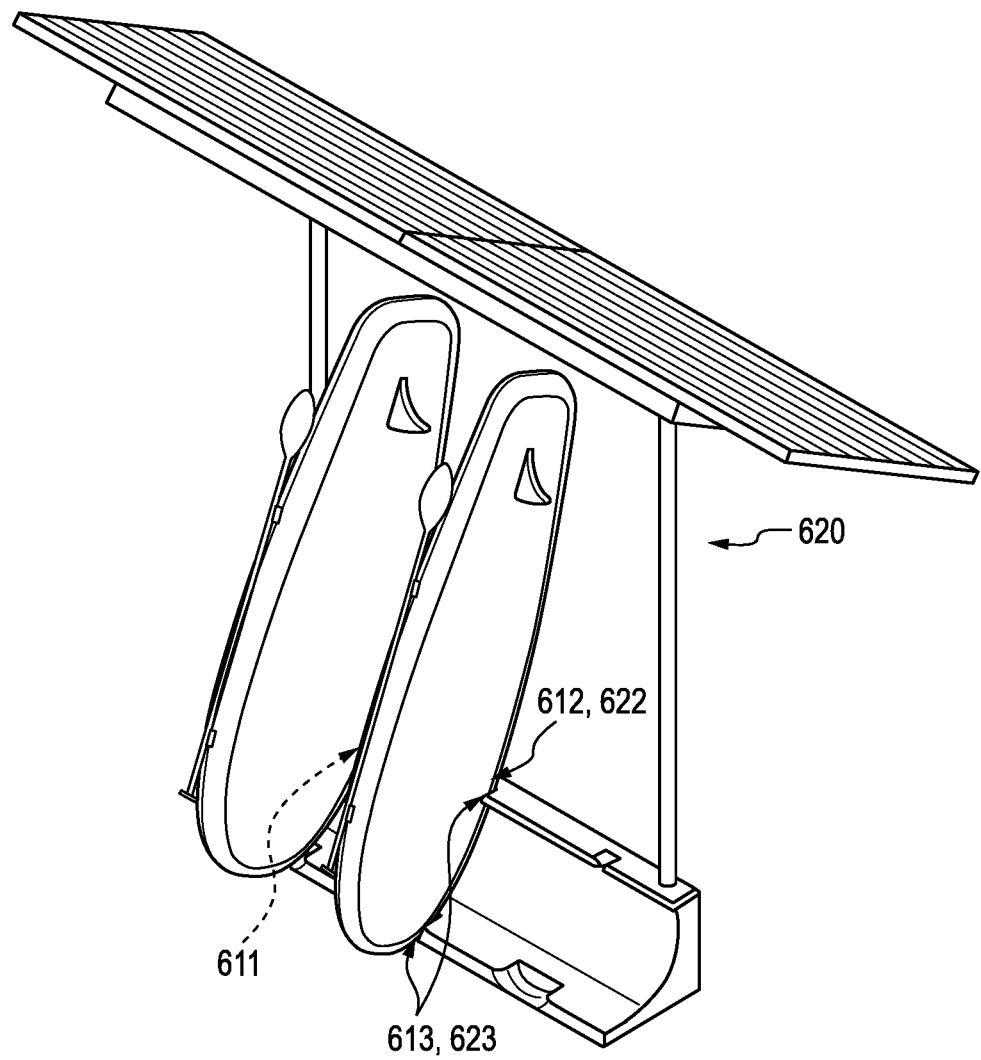
FIG. 6C is an illustration of a further embodiment of a watercraft locking, sharing and renting system in a locked state.

An embodiment of the watercraft locking, sharing and renting system is illustrated in FIGS. 6A, 6B and 6C. Referring to FIG. 6A, an embodiment of a docking station 620 of the present invention is illustrated. The docking station 620 may be configured to be capable of securing and charging multiple watercraft at the same time. The docking station 620 may include a body 621, a solar panel 624, docking-station lock components 622, and docking-station electrical contacts 623. The lock components 622 may simultaneously act as electrical contacts. The docking station body 621 may be configured with the lock components 622 and electrical contacts 623 being integrally formed within the exterior surface of the body 621.

The docking station body 621 may house at least one docking station device, may house a plurality of docking station devices, or may house various components such that it acts similarly to the docking station device described in relation to FIGS. 1, 2 and 3. For example, the docking station 620 may include components, housed within the docking station body 621, including a microcontroller, wireless communication components, a processor, power supply components and data storage components.

The power supply components may include a battery, which may be rechargeable and may be replaceable. The power supply components may include an electrical connection capable of being connected to at least one solar panel 624 or other electricity source. The power supply components may be electrically connected to the lock components 622 and/or electrical contacts 623.

The wireless communication components may include cellular communication means configured to transmit and receive data via a wireless service provider, and may include radio communication means configured to transmit and receive data via electromagnetic wave signals. The cellular communication means may include a cellular modem and may be operatively coupled to a processor or a microcontroller. The cellular modem may include an antenna and may include a cellular modem or personal communication service modem. The radio communication means may include a radio-frequency transducer and may include a Bluetooth modem, and may be operatively coupled to a processor or a microcontroller. The radio-frequency transducer may be a bidirectional transducer, and may be configured for short range communication.

The wireless communication components may be configured to scan and/or receive signals to detect a watercraft device placed in a locked state in relation to the docking station device, and acquire a unique identifier of the locked watercraft device. Optionally, the wireless communication components may be configured to scan and/or receive signals to detect a an equipment device placed in a locked state in relation to the docking station device or in relation to a watercraft device that is itself in locked state in relation to the docking station device, and acquire a unique identifier of the locked equipment device. The data storage component may include random access memory (RAM) and may be operatively coupled to a processor or microcontroller. Preferably, the docking station body 621 is water resistant, and, more preferably, is waterproof.

A docking-station lock component 622 may be an electronic locking mechanism, for example, an electronic lock latch having an electronically activated bolt, configured to be controlled by components within the body 621. The docking-station lock component 622 may include a mechanism capable of moving a locking portion of the docking-station lock component 622 into various positions, for example an electromagnet, a solenoid, or electric motor. Preferably, the docking-station lock components 622 is water resistance, and, more preferably, is waterproof. The docking-station lock component 622 may be operatively coupled to a microcontroller within the body 621. The docking-station lock component 612 may be operatively controlled to be placed in a locked state or an unlocked state by the microcontroller within the body 621.

Referring to FIG. 6B, an embodiment of a watercraft 610 of the present invention is illustrated. The water craft 610 may include a watercraft device 611, which may have a case 614, a watercraft-device lock component (WDL) 612, and at least one electrical contact 613. The watercraft device 611 may include encapsulated within the case 614, components including electrical components, and may include mechanical components. The case 614 is preferably water resistant, and more preferably is water proof. The case 614 may be of various shapes, for example rectangular, square, circular, or elliptical, and is configured to be attached to a watercraft. The watercraft device components may include control components, such as a microcontroller circuit board, wireless communication components, wireless location tracking components, a processor, and/or data storage components. The watercraft device components may include power components. The power components may be a battery, which may be rechargeable and may be replaceable. The power components may be electrically connected to the at least one electrical contact 613. The at least one electrical contact 613 is configured to be compatible with at least one electrical contact of a docking station. The at least on electrical contact 613 may be configured to receive energy by direct connection and/or by wireless connection to at least one electrical contact of a docking station. The WDL 612 is configured to be received by a lock component of a docking station, such as a docking-station-watercraft lock component. The WDL 612 is configured to be secured to a docking station. In some embodiments, the WDL 612 may have a recess or aperture corresponding to a portion of a lock component of a docking station. In other embodiments the WDL 612 may be configured to be received by a docking station lock component. For example, the WDL 612 may be an eye hook, providing an opening that a bolt within the a lock component of a docking station may pass through.

Referring to FIG. 6C, an embodiment of a watercraft locking, sharing and renting system of the present invention is illustrated. A docking station 620 is capable of receiving, locking multiple watercraft 610. The docking station 620 may be configured to and charge one or more watercraft devices (not visible). A watercraft 610 is placed in a correct orientation in relation to the docking station 620, such that a watercraft-device lock component 612 is received by a docking station lock component 622, and at least one watercraft-device electrical contact 613 is placed into sufficient proximity and/or direct contact with at least on docking-station electrical contact 623. The docking station lock component 622 may be controlled by docking station components to be placed in a locked or unlocked state when a watercraft-device lock component 612 has been correctly received by the docking station lock component 622. A docking station power component may be controlled by a docking station component to supply energy to the docking station electrical contact 623, which may transfer energy directly and/or wirelessly to a watercraft-device electrical contact 613.

Figure 7:
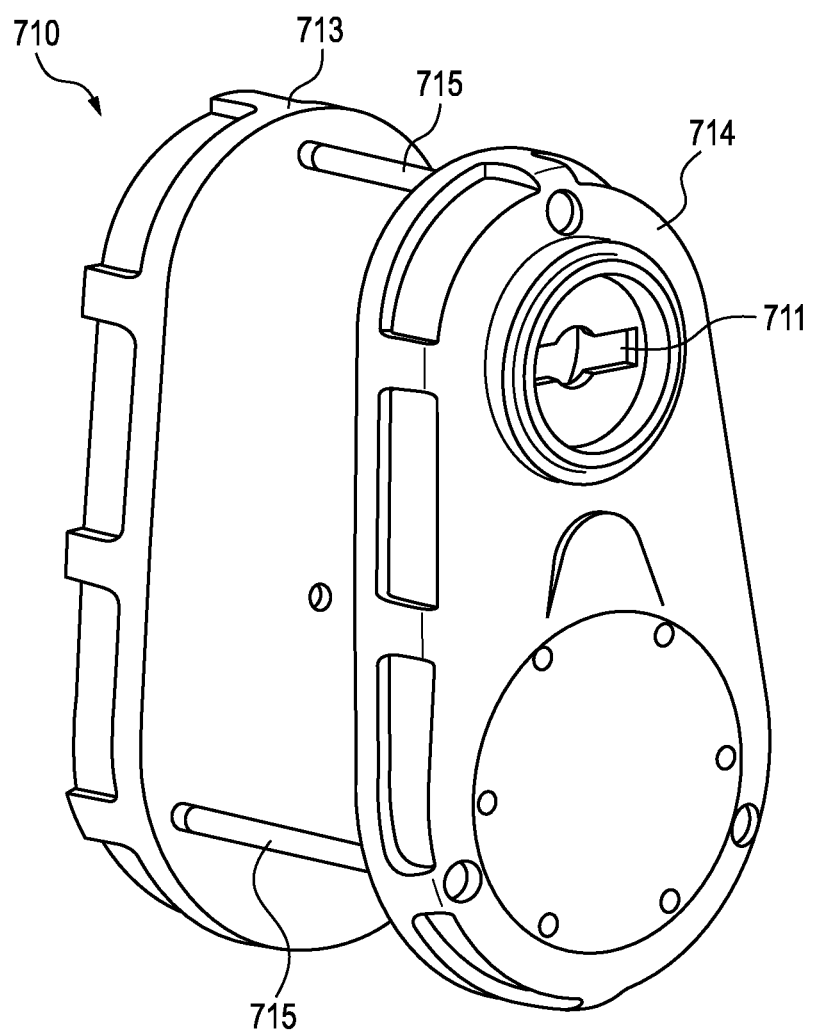
FIG. 7 is an illustration of another embodiment of a watercraft-borne device.
Figure 8:
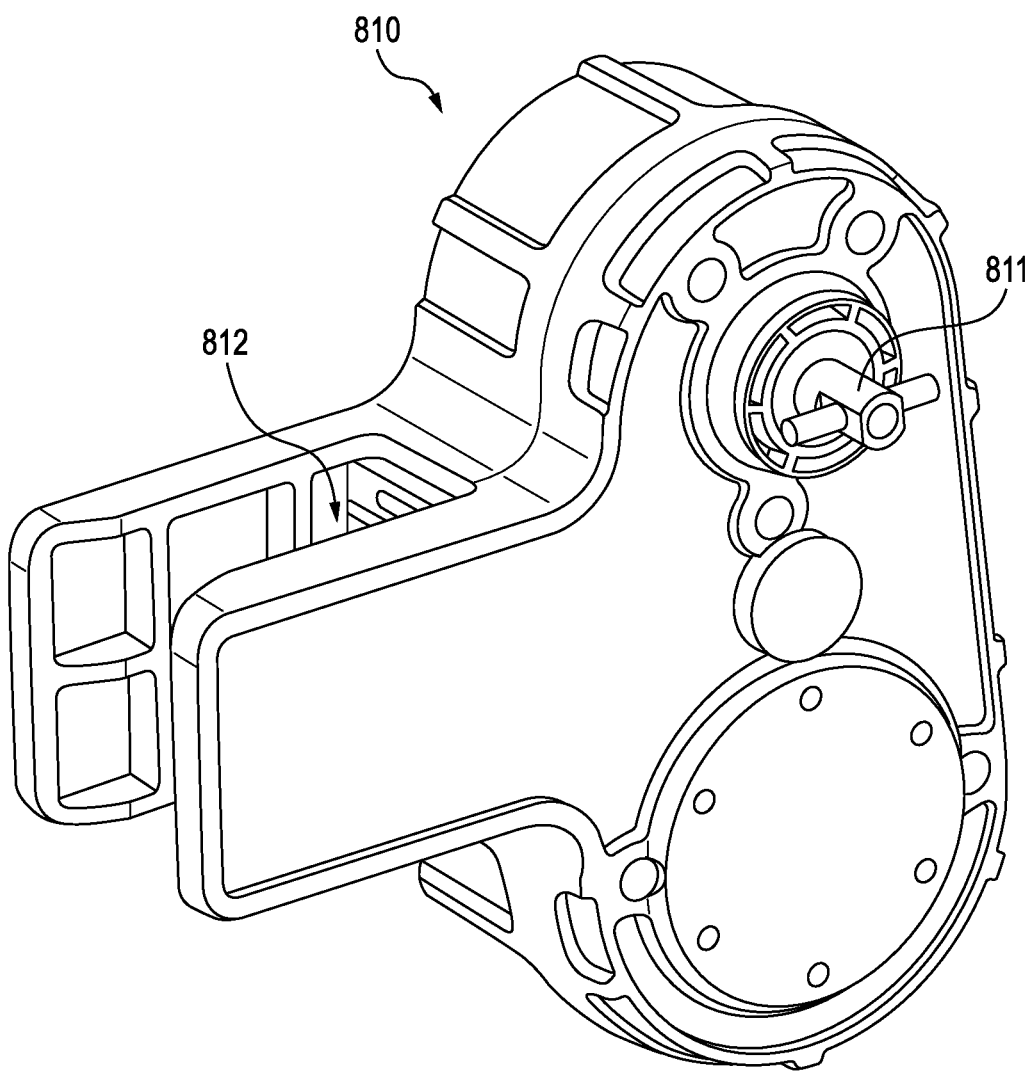
FIG. 8 is an illustration of an embodiment of a docking-station lock component.
Figure 9:
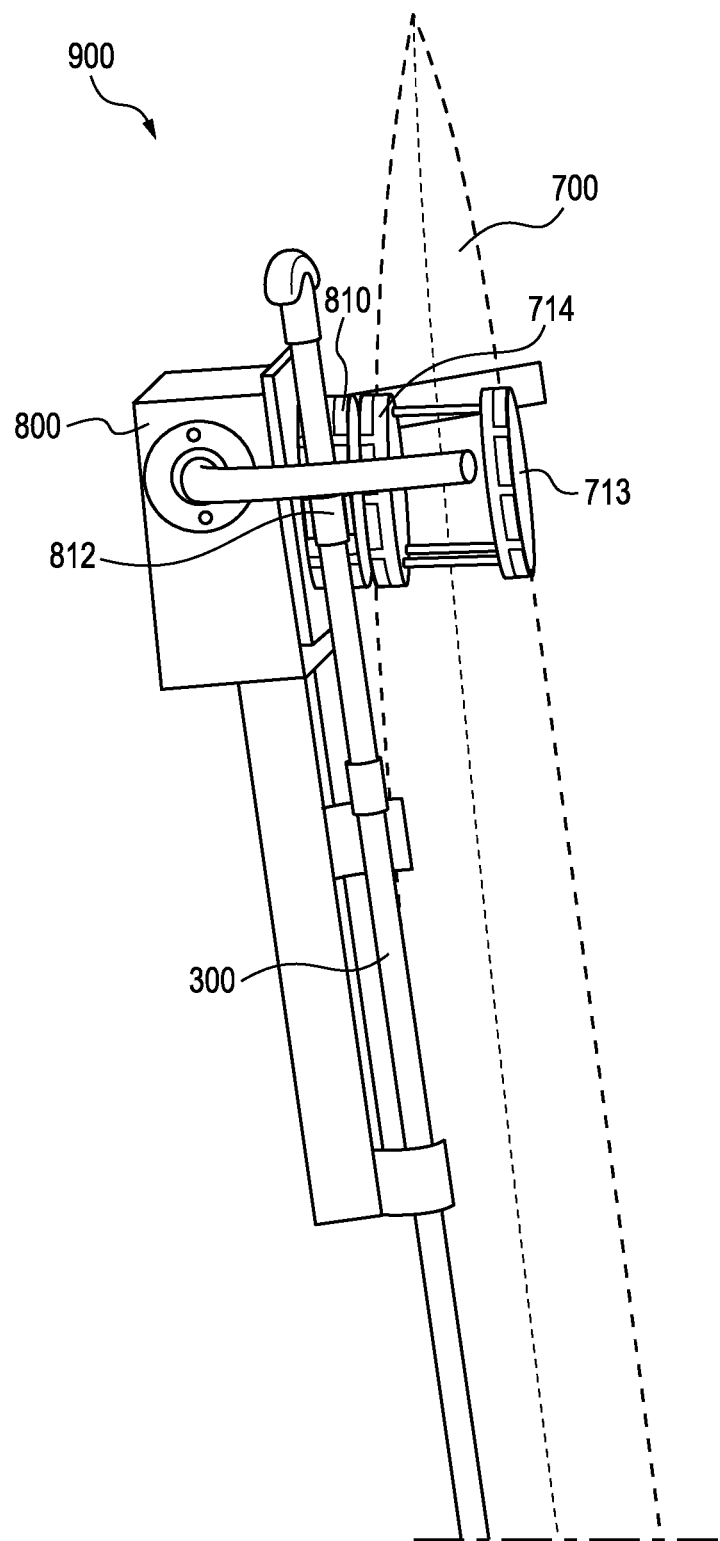
FIG. 9 is an illustration of another embodiment of a watercraft locking, sharing and renting system in a locked state.

In certain embodiments, as illustrated in FIGS. 7, 8 and 9, the docking station may include a docking station lock component that both the watercraft and the watercraft equipment couple with to securely and releasably lock the watercraft and watercraft equipment to the docking station.

Referring to FIG. 7, a watercraft-borne device ("WD) 710 includes a first portion 713 and second portion 714, which the watercraft is placed between. The first portion 713 and the second portion 714 are coupled through the watercraft by one or more connecting portions 715. For example, holes may be created through a watercraft and the connecting portions couple the first portion 713 to the second portion 714 by passing through the holes and being secured to the first portion 713 and second portion 714 via, for example, screws or other attachment means. In some embodiments the first portion 713 and/or second portion 714 are also mounted to the watercraft via, for example, screws or other attachment means. The second portion of the WD includes a watercraft-device lock component ("WDL") 711, configured to couple with a docking-station-watercraft lock component. The WDL 711 is an aperture configured to receive a docking-station-watercraft lock component.

Referring to FIG. 8, an embodiment of a lock component 810 of a docking-station is shown including a docking-station-watercraft lock component ("DDWL") 811 and a docking-station-watercraft-equipment lock component ("DDEL") 812. Preferably, the docking-station lock component 810 is water resistance, and, more preferably, is waterproof. The DDWL 811 is configured to couple with the WDL 711, and the DDEL 812 is configured to couple with a watercraft-equipment lock component of a watercraft equipment. The docking-station lock component 810 may include one or more mechanisms capable of moving a locking portion of the DDWL 811, and/or the DDEL 812, into various positions, for example an electromagnet, a solenoid, or electric motor. The DDWL and the DDEL may be operatively coupled to one or more microcontrollers within a docking station or docking-station device. The DDWL and DDEL may each be operatively controlled to be placed in a locked state or an unlocked state by the one or more microcontrollers. In some embodiments, the DDWL is configured to be received and secured a watercraft lock component, such as watercraft-device lock component. In other embodiments, the DDWL is configured to receive and secure a watercraft lock component, such as a watercraft-device lock component.

Referring to FIG. 9, an embodiment of a watercraft locking and sharing system 900 is shown with the watercraft 700 (shown in dashed lines) securely locked to the docking station 800, and the watercraft equipment 300 securely locked to the docking station 800. The first portion 713 and second portion 714 of the WD 710 are coupled through the watercraft 700. The WDL 711 (not visible) has received, and is coupled with, the DDWL 811 (not visible) and the DDWL has been placed in a locked state such that the watercraft 700 is securely and releasably attached to the docking station 800. The watercraft-equipment lock component (not visible) has been received by, and is coupled with, the DDEL 812 and the DDEL has been placed in a locked state such that the watercraft equipment 300 is securely and releasably attached to the docking station 800.

Figure 10:
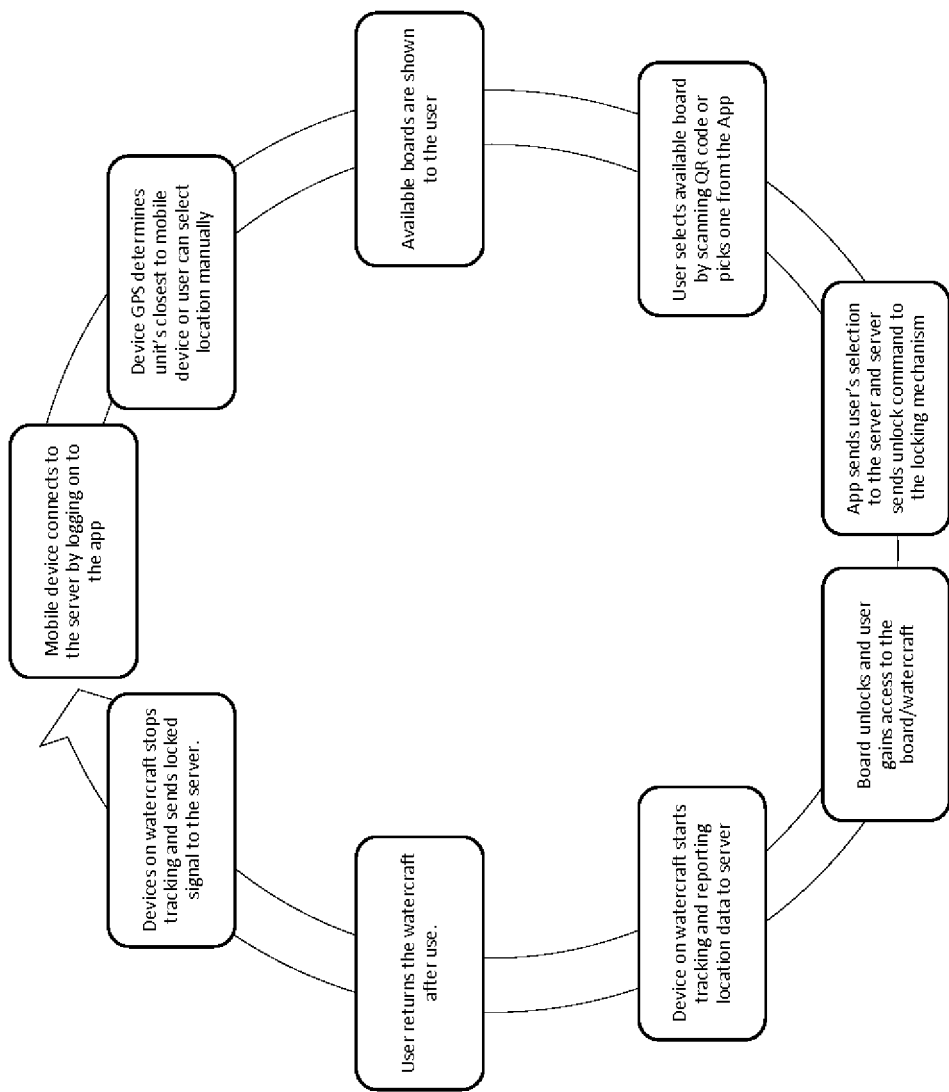
FIG. 10 is a flow chart of an embodiment of a watercraft locking, sharing and renting method.
Figure 11:
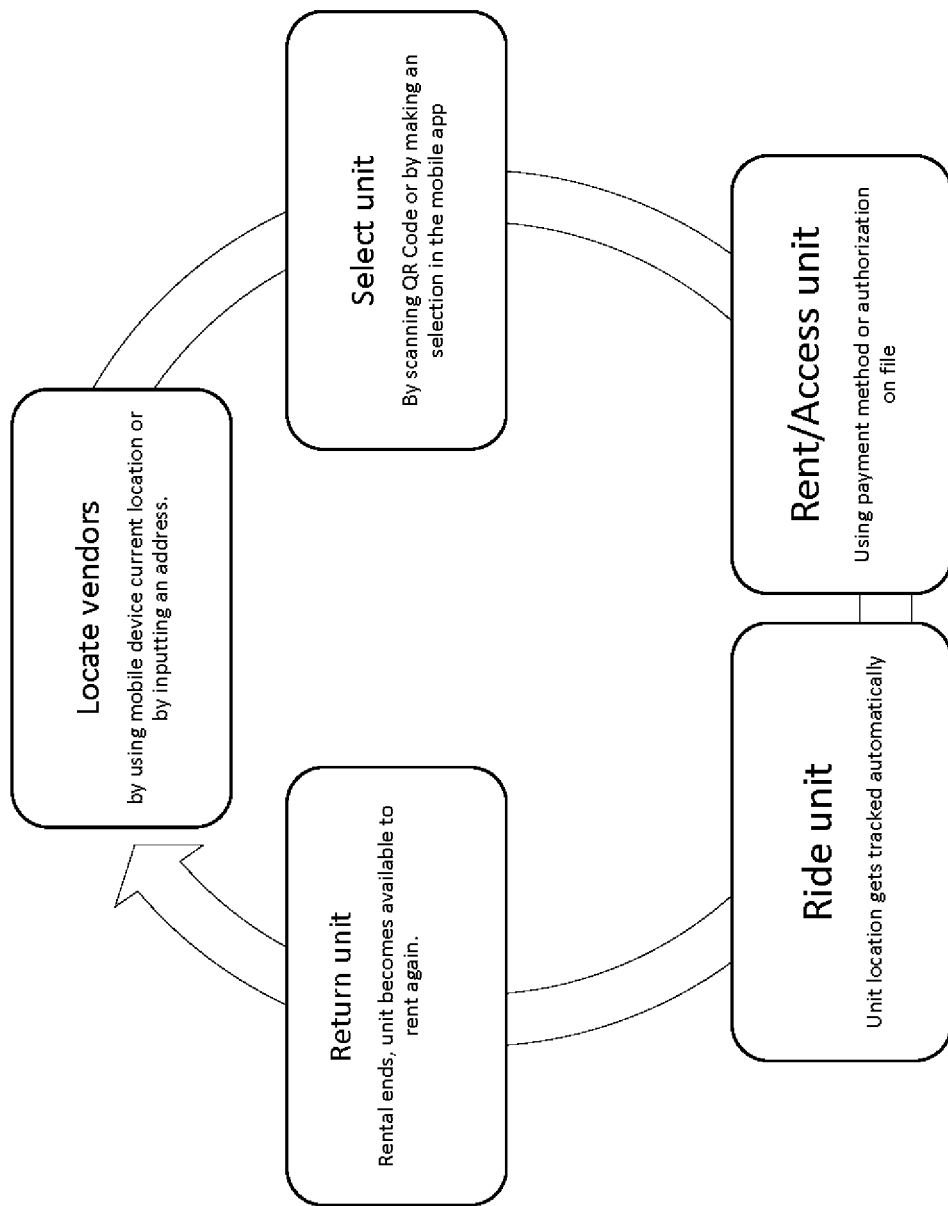
FIG. 11 is another flow chart of an embodiment of a watercraft locking, sharing and renting method.

Referring to FIGS. 10 and 11, work flows of embodiments of the watercraft locking, sharing and renting system of the present invention will be discussed. The watercraft locking, sharing and renting ("WLSR") system may include a watercraft locking system described above in reference to any of FIG. 1 through FIG. 9. For example, the WLSR system may include at least one docking station, and at least one watercraft. Optionally, the WLSR system may include at least one watercraft equipment. The WLSR system may include software, for example computer readable and executable program code/instructions, and may include a server, for example an internet connected server having at least one processor, at least one data storage component, internet connection components, and power supply components. The WLSR system software may include a mobile application, a web application, an internet accessed software platform, or a software application stored on an internet connected device. The WLSR system software may include a software platform. The software platform may include watercraft-device software, docking-station software, server software, and/or mobile-device software. The mobile-device software may be a WLSR mobile application.

Each watercraft may have at least one assigned unique identifier, which the server may use to catalog and track the availability of each watercraft. Each watercraft-device may have at least one assigned unique identifier, which the server may use to catalog and track the availability of each watercraft-device and/or each watercraft. Each docking station may have at least one assigned unique identifier, which the server may use to catalog and track the watercraft availability at each docking station. Each docking-station lock component may have a unique identifier, which the server may use to catalog and track the docking-station lock component availability at each docking station. Each watercraft-device lock component may have a unique identifier, which the server may use to catalog and track the availability of each watercraft-device and/or watercraft. Each watercraft equipment may have at least one assigned unique identifier, which the server may use to catalog and track the availability of each watercraft equipment. Optionally, the server may catalog and track the location of each watercraft, docking station and/or watercraft equipment.

A watercraft device may send and receive signals to and from a docking station of the WLSR system. For example, a watercraft device may send watercraft-device signals to the server, a docking station and/or a mobile device. A watercraft device may send watercraft availability information to the server via the watercraft-device components, mobile-device components and/or via the docking-station components. Optionally, a watercraft device may send watercraft location information to the server via the watercraft-device components, mobile-device components and/or via the docking-station components. Optionally, a watercraft device may send and receive signals to and/or from a watercraft equipment of the WLSR system. Optionally, a watercraft device may send watercraft equipment availability information to the server via the watercraft-device components, mobile-device components and/or the docking-station components.

A docking station may send and receive signals to and from a watercraft device of the WLSR system. For example, a docking station may send docking-station signals to the server, a mobile device, and/or a watercraft device. A docking station may send watercraft availability information to the server via the docking-station components, mobile-device components and/or via the watercraft-device components. A docking station may send docking-station lock component availability information to the server via the docking-station components, mobile-device components and/or via the watercraft-device components. Optionally, a docking station may send watercraft location information to the server via the watercraft-device components, mobile-device components, and/or via the docking-station components. Optionally, a docking station may send and receive signals to and from watercraft equipment of the WLSR system. Optionally, a docking station may send watercraft equipment availability information to the server via the watercraft-device components, mobile-device components and/or the docking-station components.

A server may send and receive signals to/from a watercraft-device, a docking station, a mobile device having at least a portion of the WLSR software (for example, a WLSR mobile application), and/or an internet connected device having access to the WLSR software. For example, the server may send a server signal containing watercraft location information, watercraft availability information, docking station location information, and/or docking-station lock component availability information to a mobile device. A server may store watercraft availability information, watercraft location information, docking station location information, docking station lock component availability information, watercraft equipment availability information, and/or watercraft equipment location information.

A mobile device having at least a portion of the WLSR software (for example, a mobile application) may send and receive signals to/from a watercraft-device, a docking station, and/or a server. For example, a mobile device may send a mobile-device signal containing application-request information to a server, and may send a mobile-device signal containing watercraft-component information and/or watercraft-equipment information to a watercraft-device, a docking station, and/or a docking-station device.

In one embodiment, a user having a mobile device, which may include a processor, a display, a camera, a data storage component, wireless communication components, and/or location tracking components, obtains at least a portion of the WLSR software, for example, by downloading mobile-device software, for example the WLSR mobile application, to the mobile device. The user may wirelessly connect the mobile device to the server by logging into the WLSR mobile application. The mobile application may instruct the components of the mobile device to acquire the approximate location of the mobile device, and based on the acquired location populate the closest WLSR docking station, or stations, on the display of the mobile device. Optionally, the user may input a street address into the mobile application, and based on the street address the mobile application populates the closest WLSR docking station or stations on the display of the mobile application. The user may select a populated WLSR docking station and the mobile application may cause the mobile device to populate watercraft availability information for the selected location. The mobile application may acquire information, for example, WLSR docking station location information and/or WLSR docking station specific watercraft availability information, by sending a signal containing application-request information, via the mobile device components, to the server, which requests the information. The server may send a server signal containing the requested location and/or availability information to the mobile device.

In response to receiving a server signal containing the requested location and/or availability information, the mobile application may populate available watercraft on the display of the mobile device. The user may select an available watercraft via the mobile application, or by scanning a unique identifier of a watercraft with the mobile device components when in sufficient proximity to the watercraft. The mobile application may send a mobile-device signal, for example containing the unique identification information of the selected watercraft, to the server including application-request information for the selected watercraft to be placed in an unlocked state. The server may send a server signal containing watercraft-component information to the mobile device, watercraft device, and/or docking station. The watercraft-component information may be used to generate instructions for the components operatively connected to the electrical lock components associated with the unique identifier of the selected watercraft, which instructs the components to place the electrical lock component in an unlocked state.

For example, in some embodiments the server signal containing watercraft-component information may be received by the watercraft device, and the components of the watercraft device may generate instructions based on the watercraft-component information to place an electrical lock component associated with the unique identifier of the selected watercraft in an unlocked state. In other embodiments, the server signal may be received by the watercraft device, and the components of the watercraft device may generate a watercraft-device signal containing watercraft-component information based on the received server signal and send the watercraft-device signal to the docking station or docking-station device containing an electrical lock component associated with the unique identifier of the selected watercraft such that the docking station or docking-station device may place the electrical lock component in an unlocked state.

In other embodiments, the server signal containing watercraft-component information may be received by the docking station or docking-station device, and the components of the docking station or docking-station device may generate instructions based on the received server signal to place an electrical lock component associated with the unique identifier of the selected watercraft in an unlocked state. In some embodiments, the server signal containing watercraft-component information may be received by the docking station or docking-station device, and the components of the docking station or docking-station device may generate a docking-station signal containing watercraft-component information based on the received server signal and send the docking-station signal to the watercraft device containing an electrical lock component associated with the unique identifier of the selected watercraft such that the watercraft device may place the electrical lock component in an unlocked state.

Alternatively, in some embodiments, the server signal containing watercraft-component information may be received by the mobile device, and the components of the mobile device may generate a mobile-device signal containing watercraft-component information based on the received server signal and send the mobile-device signal to the docking station, docking-station device, or watercraft device containing an electrical lock component associated with the unique identifier of the selected watercraft such that the docking station, docking-station device, or watercraft device may place the electrical lock component in an unlocked state.

Once the electrical lock component associated with the unique identifier of the watercraft is placed in an unlocked state, the user gains access to the selected watercraft and a signal is sent including watercraft availability information to the server by the components operatively connected to the electrical lock components. The electrical lock component may be within the watercraft-device, a docking station, or a docking-station device.

In some embodiments, the server may also similarly send a signal containing watercraft-equipment-component information to the watercraft device, docking station, or docking-station device operatively connected to an electrical lock component associated with watercraft equipment, which instructs the components to place the electrical lock component in an unlocked state. Alternatively, the server may send a signal containing watercraft-equipment-component information to a mobile device, watercraft device, docking station or docking-station device, which then generates and sends a signal containing watercraft-equipment-component information to the watercraft device, docking station, or docking-station device operatively connected to an electrical lock component associated with watercraft equipment, which instructs the components to place the electrical lock component in an unlocked state. Once the electrical lock component associated with the watercraft equipment is placed in an unlocked state, the user gains access to the watercraft equipment and a signal is sent including watercraft equipment availability information to the server by the components operatively connected to the electrical lock component. The electrical lock component may be within the watercraft device, a docking station, or a docking-station device.

In certain embodiments, a single signal from the server, mobile device, docking-station device or watercraft device may be configured to cause multiple electrical lock components to unlock. For example, the same signal that unlocks the lock components securing a watercraft to a docking station may also unlock the lock components securing a watercraft equipment to a watercraft and/or docking station.

After the selected watercraft is unlocked, the watercraft-device may begin tracking the watercraft location and sending watercraft location information to the server via the watercraft-device components. The watercraft location information may be sent at predetermined intervals or times.

When the user returns the watercraft and places the watercraft lock component into the correct configuration with a docking-station lock component of the docking station the watercraft was unlocked from, or with a docking-station lock component of another docking station of the system, the components operatively connected to the electrical lock component, for example the electrical lock component associated with the unique identifier of the watercraft, may place the electrical lock component in a locked state. The system may autonomously detect the presence of lock components in the correct configuration, as well as the presence of a watercraft having an accepted unique identifier, and automatically engage the electrical lock component to secure the watercraft to the docking station. Once the watercraft device is locked to the docking station, the watercraft device stops tracking the watercraft location, and a signal is sent to the server identifying the watercraft as locked to the docking station and available for use.

Optionally, when the user returns the watercraft equipment and places the watercraft-equipment lock component into the correct configuration with an electrical lock component of the watercraft device, docking-station device, or docking station the watercraft equipment was unlocked from, or of another watercraft device, docking-station device or docking station of the system, the components operatively connected to the electrical lock component, for example an electrical lock component associated with the unique identifier of the watercraft equipment, may place the electrical lock component in a locked state. The system may autonomously detect the presence of lock components in the correct configuration, as well as the presence of a watercraft equipment having an accepted unique identifier, and automatically engage the electrical lock component to secure the watercraft equipment to a watercraft device, docking station, or docking-station device. Once the watercraft equipment is locked to the electrical lock component, a signal is sent to the server identifying the watercraft equipment as locked to the electrical lock component.

Alternatively, when intending to return the watercraft, the user may wirelessly connect the mobile device to the server by logging into the WLSR mobile application. The mobile application may instruct the components of the mobile device to acquire the approximate location of the mobile device, and based on the acquired location may populate the closest WLSR docking station or stations on the display of the mobile device. Optionally, the user may input a street address into the mobile application, and based on the street address the mobile application may populate the closest WLSR docking station or stations on the display of the mobile device. The user may select a populated WLSR docking station and the mobile application may cause the mobile device to populate docking-station lock component availability information for the selected docking station. The mobile application may acquire WLSR docking station location information and WLSR docking station specific lock component availability information by sending a mobile-device signal containing application-request information, via the mobile device components, to the server for the information.

An owner of a docking station, docking-station device, watercraft, watercraft-device, watercraft equipment, and/or watercraft-equipment device, may connect to the server by logging into WLSR software, for example, on a mobile device or internet connected device. The owner may access the watercraft availability information, watercraft location information, docking-station lock component availability information, watercraft equipment availability information, sales information, and rental information via the WLSR software. The owner may request location information for any item in the WLSR system, which causes a location information request signal to be sent to the selected item or an associated item. The owner may activate or deactivate watercraft-device lock components, docking-station lock components, docking-station device lock components, or watercraft-equipment lock components via the WLSR software. The owner may manually update availability information, as well as watercraft, watercraft device, watercraft equipment, watercraft-equipment device, docking station and docking-station device location and/or availability information via the WLSR software.

In a further embodiment of a WLSR system, when the user selects an available watercraft or watercraft equipment in the mobile application, or scans a unique identifier of a watercraft or watercraft equipment with the mobile device components, the mobile application may send a mobile-device signal, for example Bluetooth signal, near-field communication signal, or other electromagnetic signal, to the components operatively connected to the electrical lock components associated with the unique identifier of the watercraft or watercraft equipment, which instructs the components to place the electrical lock component in an unlocked state. Once the electrical lock component associated with the unique identifier of the watercraft or watercraft equipment is placed in an unlocked state, the user gains access to the selected watercraft or watercraft equipment and a signal is sent including watercraft availability information to the server by the components operatively connected to the electrical lock components. The electrical lock component may be within the watercraft-device, a docking station, or a docking-station device.

In another embodiment of a WLSR system, a user's request to unlock an item of the WLSR system may cause a signal to be sent to an electrical lock component after the WLSR system confirms the user is authorized to unlock an item, for example once payment for the selected item and/or rental period is completed.

In some embodiments, the watercraft locking, sharing and renting system of the present invention enables owners and/or vendors of one or more watercraft, watercraft device, watercraft equipment, watercraft equipment, watercraft-equipment device, docking station, and/or docking-station device to configure where the watercraft or watercraft equipment may be returned to, for example predetermined docking stations as opposed to any docking station. For example if vendor A owns or operates docking stations at two different locations the vendor may pre-approve watercraft or watercraft equipment returns to stations in either location, but the renter cannot return the watercraft to a vendor B owned or operated docking station unless vendor A has approved a station that belongs to vendor B for returns. A watercraft rented from vendor B cannot be returned to one of vendor A's docking stations unless vendor B has approved those stations for returns. This gives vendors the ability to keep their watercraft returning to the same location or to help watercraft migrate to a more desirable location.

As should be readily understood, the embodiments stated above are not intended to define the scope of the materials or dimensions able to be utilized within the present invention. Various materials and dimensions may be used for the features described therein, and those set forth above are to serve as examples of preferred embodiments.

In this regard, any number of the features of the different embodiments described herein may be combined into one single embodiment, and all features of a given embodiment need not be included in other embodiments. Moreover, the scope of the present invention covers conventionally known and future developed variations and modifications to the components and materials described herein, as would be understood by those skilled in the art.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

What is claimed is:

1. A system for use with a watercraft, comprising:
  a watercraft device for coupling to, or forming part of, the watercraft, the watercraft device comprising a first watercraft lock component;
  a docking station comprising at least one second watercraft lock component configured to couple with at least the first watercraft lock component;
  at least one microcontroller and at least one wireless communication component forming part of at least one of the watercraft device and docking station, at least one of the watercraft lock components is configured to be placed in at least one of a locked state, where the watercraft device is secured to the docking station, and an unlocked state, where the watercraft device is removable from the docking station, by the at least one microcontroller, the at least one microcontroller configured to place at least one of the watercraft lock components in the unlocked state in response to a signal received by the at least one wireless communication component;
  a server having at least one processor, at least one communication component, at least one data storage component containing program code for controlling server components to communicate with at least one of the watercraft device, at least one mobile device, and the docking station, the server configured to selectively generate and transmit a server signal;
  a mobile device having a processor, at least one wireless communication component, at least one data storage component containing program code for controlling mobile-device components to communicate with at least one of the watercraft device, the docking station, and the server, the mobile device configured to selectively generate and transmit a mobile-device signal;
  wherein:
    at least one of the server signal and the mobile-device signal causes the at least one microcontroller to place at least one of the watercraft lock components in the unlocked state;
    the second watercraft lock component comprises an electronic locking mechanism;
    the watercraft device further comprises a processor, a wireless communication component, a data storage component containing program code for controlling components of the watercraft device to communicate with the server and the docking station, the watercraft device configured to generate and transmit a watercraft-device signal in response to the server signal received by the wireless communication component of the watercraft device; and
    the docking station further comprises a processor, a microcontroller, a wireless communication component, and a data storage component containing program code for controlling components of the docking station to instruct the microcontroller of the docking station to place the second watercraft lock component in the unlocked state in response to the watercraft-device signal received by the wireless communication component of the docking station.

2. The system of claim 1, wherein the server generates and transmits the server signal in response to receiving the mobile-device signal.

3. A system for use with a watercraft, comprising:
  a watercraft device for coupling to, or forming part of, the watercraft, the watercraft device comprising a first watercraft lock component;
  a docking station comprising at least one second watercraft lock component configured to couple with at least the first watercraft lock component;
  at least one microcontroller and at least one wireless communication component forming part of at least one of the watercraft device and docking station;
  a watercraft equipment having a watercraft-equipment device comprising a first watercraft-equipment lock component; and
  a second watercraft-equipment lock component forming part of at least one of the watercraft device and the docking station;
  a server having at least one processor, at least one communication component, and at least one data storage component containing program code for controlling components of the server to communicate with the watercraft device, the server configured to generate and transmit a server signal;
wherein:
at least one of the watercraft lock components configured to be placed in at least one of a locked state, where the watercraft device is secured to the docking station, and an unlocked state, where the watercraft device is removable from the docking station, by the at least one microcontroller;
at least one of the watercraft-equipment lock components configured to be placed in at least one of a locked state, where the watercraft equipment is secured to at least one of the watercraft device and the docking station, and an unlocked state, where the watercraft equipment is removable from at least one of the watercraft device and the docking station, by the at least one microcontroller;
the at least one microcontroller configured to place at least one of the watercraft lock components in the unlocked state in response to a signal received by the at least one wireless communication component;
the watercraft device further comprises a processor, a wireless communication component, and a data storage component containing program code for controlling components of the watercraft device to communicate with the server and the docking station, the watercraft device configured to generate and transmit a watercraft-device signal;
the docking station further comprises a processor, a microcontroller, a wireless communication component, the second watercraft-equipment lock component comprising an electronic locking mechanism, and a data storage component containing program code for controlling components of the docking station to communicate with the watercraft device and to instruct the microcontroller to place the second watercraft-equipment lock component in the unlocked state; and
the signal received by the wireless communication component of the docking station is the watercraft-device signal.

4. A system for use with a watercraft, comprising:
a watercraft device for coupling to, or forming part of, the watercraft, the watercraft device comprising a first watercraft lock component;
a docking station comprising at least one second watercraft lock component configured to couple with at least the first watercraft lock component;
at least one microcontroller and at least one wireless communication component forming part of at least one of the watercraft device and docking station;
a watercraft equipment having a watercraft-equipment device comprising a first watercraft-equipment lock component;
a second watercraft-equipment lock component forming part of at least one of the watercraft device and the docking station; and
a server having at least one processor, at least one communication component, and at least one data storage component containing program code for controlling components of the server to communicate with the docking station, the server configured to generate and transmit a server signal;
wherein:
at least one of the watercraft lock components configured to be placed in at least one of a locked state, where the watercraft device is secured to the docking station, and an unlocked state, where the watercraft device is removable from the docking station, by at least one microcontroller;
at least one of the watercraft-equipment lock components configured to be placed in at least one of a locked state, where the watercraft equipment is secured to at least one of the watercraft device and the docking station, and an unlocked state, where the watercraft equipment is removable from at least one of the watercraft device and the docking station, by at least one microcontroller;
the at least one microcontroller configured to place at least one of the watercraft lock components in the unlocked state in response to a signal received by the at least one wireless communication component;
the docking station further comprises a processor, a microcontroller, a wireless communication component, the second watercraft-equipment lock component comprising an electronic locking mechanism, and a data storage component containing program code for controlling components of the docking station to communicate with the server and to instruct the microcontroller to place the second watercraft-equipment lock component in the unlocked state; and
the signal received by the wireless communication component of the docking station is the server signal.

5. A method for automated renting of watercraft, comprising:
providing a watercraft system comprising:
a watercraft device configured to attach to, or form part of, a watercraft, the watercraft device comprising a first watercraft lock component;
at least one docking station comprising at least one second watercraft lock component configured to couple with at least one first watercraft lock component; and
at least one of the watercraft lock components configured to be placed in at least one of a locked state, where the watercraft is secured to the docking station, and an unlocked state, where the watercraft is removable from the docking station, by at least one microcontroller, the at least one microcontroller configured to place the watercraft lock components in an unlocked state in response to a signal received by at least one wireless communication component, the at least one microcontroller and at least one wireless communication component forming part of at least one of the watercraft device and docking station;
providing program code to a mobile device of a user, the mobile device comprising a processor, at least one wireless communication component, at least one data storage component, and at least one power component;
receiving, at a server, a mobile-device signal, the mobile-device signal including application-request information generated by the program code and corresponding to a request to place at least one of the watercraft lock components in an unlocked state;
sending from the server, to at least one of the watercraft device, the mobile device and the docking station, a server signal in response to the application-request information, the responsive server signal including watercraft-component information concerning at least one watercraft lock component; and instructing a microcontroller to place at least one of the watercraft lock components in the unlocked state in response to receiving a signal containing watercraft-component information;

wherein:

the microcontroller instructed to place at least one of the watercraft lock components in the unlocked state forms part of the docking station and is operatively coupled to the second watercraft lock component of the docking station.

6. A method for automated renting of watercraft, comprising:

providing a watercraft system comprising:
- a watercraft device configured to attach to, or form part of, a watercraft, the watercraft device comprising a first watercraft lock component;
- at least one docking station comprising at least one second watercraft lock component configured to couple with at least one first watercraft lock component;
- at least one of the watercraft lock components configured to be placed in at least one of a locked state, where the watercraft is secured to the docking station, and an unlocked state, where the watercraft is removable from the docking station, by at least one microcontroller, the at least one microcontroller configured to place the watercraft lock components in an unlocked state in response to a signal received by at least one wireless communication component, the at least one microcontroller and at least one wireless communication component forming part of at least one of the watercraft device and docking station;

providing program code to a mobile device of a user, the mobile device comprising a processor, at least one wireless communication component, at least one data storage component, and at least one power component;

receiving, at a server, a mobile-device signal, the mobile-device signal including application-request information generated by the program code and corresponding to a request to place at least one of the watercraft lock components in an unlocked state;

sending from the server, to at least one of the watercraft device, the mobile device and the docking station, a server signal in response to the application-request information, the responsive server signal including watercraft-component information concerning at least one watercraft lock component;

instructing a microcontroller to place at least one of the watercraft lock components in the unlocked state in response to receiving a signal containing watercraft-component information;

providing a watercraft equipment having a first watercraft-equipment lock component, the first watercraft-equipment lock component configured to couple with at least one second watercraft-equipment lock component forming part of the docking station, the watercraft-equipment lock components configured to be placed in at least one of a locked state, where the watercraft equipment is secured to the docking station, and an unlocked state, where the watercraft equipment is removable from the docking station, by at least one microcontroller; and instructing a microcontroller to place the second watercraft-equipment lock component in the unlocked state in response to a wireless communication component of the docking stating receiving at least one of a server signal, a mobile-device signal and a watercraft-device signal.

7. The method of claim 5, further comprising:

providing a watercraft equipment having a first watercraft-equipment lock component, the first watercraft-equipment lock component configured to couple with at least one second watercraft lock component forming part of at least one of the watercraft device and the docking station, the watercraft-equipment lock components configured to be placed in at least one of a locked state, where the watercraft equipment is secured to at least one of the watercraft device and the docking station, and an unlocked state, where the watercraft equipment is removable from at least one of the watercraft device and the docking station, by at least one microcontroller;

instructing a microcontroller to place the second watercraft-equipment lock component in the unlocked state in response to a wireless communication component of at least one of the watercraft device and the docking station receiving at least one of a server signal, a docking-station signal, a watercraft-device signal and a mobile-device signal.

* * * * *